(12) United States Patent
Bailey et al.

(10) Patent No.: US 7,337,166 B2
(45) Date of Patent: Feb. 26, 2008

(54) PARAMETRIC SEARCHING

(75) Inventors: Steven C. Bailey, Washington, IL (US); Stephen W. Blessin, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 207 days.

(21) Appl. No.: 11/029,157

(22) Filed: Jan. 3, 2005

(65) Prior Publication Data

US 2005/0138022 A1    Jun. 23, 2005

(51) Int. Cl.
*G06F 17/30* (2006.01)
(52) U.S. Cl. ........................................ 707/3; 707/104.1
(58) Field of Classification Search .................... 707/3, 707/10, 104.1; 705/26, 27
See application file for complete search history.

(56) References Cited

U.S. PATENT DOCUMENTS

| | | | |
|---|---|---|---|
| 4,984,155 A | 1/1991 | Geier et al. ................. 364/401 |
| 5,319,542 A | 6/1994 | King, Jr. et al. |
| 5,361,199 A | 11/1994 | Shoquist et al. ............ 364/401 |
| 5,706,496 A | 1/1998 | Noguchi et al. ............ 395/603 |
| 5,712,989 A | 1/1998 | Johnson et al. ............. 395/228 |
| 5,715,444 A | 2/1998 | Danish et al. |
| 5,870,717 A * | 2/1999 | Wiecha ....................... 705/26 |
| 5,913,210 A * | 6/1999 | Call .............................. 707/4 |
| 5,915,257 A | 6/1999 | Gartung et al. ............ 707/503 |
| 5,970,471 A | 10/1999 | Hill ............................. 705/26 |
| 5,970,475 A | 10/1999 | Barnes et al. ................ 705/27 |
| 5,978,800 A | 11/1999 | Yokoyama et al. |
| 5,999,915 A * | 12/1999 | Nahan et al. ................. 705/27 |
| 6,014,639 A * | 1/2000 | Fohn et al. ................... 705/27 |
| 6,023,683 A | 2/2000 | Johnson et al. ............ 705/26 |
| 6,032,145 A | 2/2000 | Beall et al. |
| 6,041,326 A | 3/2000 | Amro et al. .................. 707/10 |
| 6,055,516 A | 4/2000 | Johnson et al. ............. 705/27 |
| 6,078,866 A | 6/2000 | Buck et al. ................... 702/2 |
| 6,081,804 A | 6/2000 | Smith ........................... 707/5 |
| 6,094,649 A | 7/2000 | Bowen et al. ................ 707/3 |
| 6,134,557 A | 10/2000 | Freeman |
| 6,141,653 A | 10/2000 | Conklin et al. |
| 6,144,958 A | 11/2000 | Ortega et al. |
| 6,275,821 B1 * | 8/2001 | Danish et al. ................ 707/3 |
| 6,286,002 B1 * | 9/2001 | Axaopoulos et al. ........ 707/10 |
| 6,321,224 B1 | 11/2001 | Beall et al. |
| 6,324,522 B2 * | 11/2001 | Peterson et al. ............. 705/28 |
| 6,381,597 B1 * | 4/2002 | Lin ............................... 707/4 |

(Continued)

OTHER PUBLICATIONS

Unknown, "The Keenan Vision B2X Model," KeenanVisioncom, Keenan Vision, Inc., Ex2000-4, pp. 1-4, Apr. 24, 2000.

(Continued)

*Primary Examiner*—Leslie Wong
(74) *Attorney, Agent, or Firm*—Finnegan, Henderson, Farabow, Garrett & Dunner

(57) ABSTRACT

A method is disclosed for performing parametric searching using a computer. The method includes providing, via a graphical user interface, a name associated with a desired item, and based on the provided name, generating a list of attribute characteristics associated with the name. The method further includes providing at least one specific attribute for at least one of the listed attribute characteristics, performing a search for items having the at least one specific attribute, based on the provided at least one specific attribute, and generating search results that include items having the at least one specific attribute.

20 Claims, 34 Drawing Sheets

U.S. PATENT DOCUMENTS

| | | | |
|---|---|---|---|
| 6,505,172 B1 * | 1/2003 | Johnson et al. | 705/27 |
| 6,507,823 B1 | 1/2003 | Nel | 705/26 |
| 6,584,462 B2 | 6/2003 | Neal et al. | |
| 6,604,107 B1 * | 8/2003 | Wang | 707/101 |
| 6,820,076 B2 | 11/2004 | Bailey et al. | |
| 7,107,226 B1 * | 9/2006 | Cassidy et al. | 705/26 |
| 7,124,101 B1 | 10/2006 | Mikurak | |
| 7,124,107 B1 | 10/2006 | Pishevar et al. | |
| 2001/0044758 A1 | 11/2001 | Talib et al. | 705/27 |
| 2002/0062258 A1 | 5/2002 | Bailey et al. | |
| 2002/0091690 A1 | 7/2002 | Bailey et al. | |
| 2002/0103789 A1 | 8/2002 | Turnbull et al. | |
| 2004/0133572 A1 | 7/2004 | Bailey et al. | |

OTHER PUBLICATIONS

V. Keenan, Internet Exchange 2000, B2X Emerges As New Industry to Service Exchange Transactions, Keenan Vision, Inc., pp. 1-40, Apr. 24, 2000.

Unknown, "Dell Computer—Laptop, Desktop, Workstation, Server," Dell Computer Corporation, http://www.dell.com/us/en/gen/deault.htm, p. 1, Aug. 21, 2000.

Unknown, "Dell—Home & Home Office," Dell Computer Corporation, http://www.dell.com/us/en/dhs/deault.htm, pp. 2, Aug. 21, 2000.

Unknown, "Dell—Inspiron 3800 Series," Dell Computer Corporation, http://www.dell.com/us/en/dhs/offers/specials_3x_special05.htm, pp. 3, Aug. 21, 2000.

Unknown, "The Dell Online Store: Build Your System," Dell Computer Corporation, http://commerce.us.dell.com/dellstore/config.asp?customer_id=19&keycode=6V917&order . . . , pp. 5, Aug. 21, 2000.

Unknown, "The Dell Online Store: Build Your System," Dell Computer Corporation, http://commerce.us.dell.com/dellstore/config.asp?customer_id=19&keycode=6V917&order..., pp. 7, Aug. 21, 2000.

Unknown, "VerticalNet Press Releases," VerticalNet, Inc., the Internet's premier provider of business and industrial trade communities, VerticalNet, http://www.vertical.net/, pp. 2, Jul. 18, 2000.

Unknown, "Showcasing Companies & Products Around the Clock Around the World," VerticalNet, Inc., the Internet's premier provider of business and industrial trade communities, VerticalNet, http://www.vertical.net/, p. 1, Jul. 18, 2000.

Unknown, "Take our Product Tour!," PurchasePro.Com, Inc. Specializing In Business To Business Procurement and E-Commerce, PurchasePro.Com, http://corp.purchasepro.com/, pp. 2, Jul. 18, 2000.

Unknown, "What's New Jul. 18, 2000," FreeMarkets, 1999-2000 FreeMarkets, Inc., http://www.freemarkets.com/, p. 1, Jul. 18, 2000.

Unknown, "What We Do," What We Do -FreeMarkets, http://www.freemarkets.com/what-we-do.asp, pp. 2, Jul. 18, 2000.

Unknown, "Ariba B2B Commerce Platform OverView," Ariba: B2B Commerce Platform: Overview, http://www.ariba.com/, pp. 2, Jul. 18, 2000.

Unknown, "Ariba B2B Commerce Platform Ariba Buyer," Ariba: B2B Commerce Platforms: Ariba B2B Buyer, http://www.ariba.com/, pp. 2, Jul. 18, 2000.

Unknown, "Corporate Information Investor Relations," Ariba: Corporate: Investor Relations, http://www.ariba.com/, pp. 2, Jul. 18, 2000.

Unknown, "E-Manufacturing is Clicking On," powerize.com, E-Manufacturing is Clicking On—Material Handling Management, http://www.corp.powerize.com/EC/2000/08/25/doc1.html, pp. 2, Aug. 25, 2000.

Unknown, "Microsoft in Manufacturing," powerize.com, Microsoft in Manufacturing—Manufacturing Engineering, http://www.corp.powerize.com/EC/2000/08/25/doc2.html, pp. 6, Aug. 25, 2000.

Unknown, "Simulation Strategies," powerize.com, Simulation Strategies—Industry Week, http://www.corp.powerize.com/EC/2000/08/25/doc3.html, pp. 2, Aug. 25, 2000.

Unknown, "Midcap Stocks: Manufacturing," powerize.com, Midcap Stock Manufacturing—123Jump, http://www.corp.powerize.com/EC/2000/08/25/doc4.html, pp. 2, Aug. 25, 2000.

Unknown, "B2B Surveys Predict Both Shake-Ups, Continuing Prosperity," B2B Surveys Predict Both Shake-Ups, Continuing Prosperity—Newsbytes, http://www.corp.powerize.com/EC/2000/08/25/doc5.html, pp. 3, Aug. 25, 2000.

Unknown, "First Call Company Estimate Profile: Aspen Technology (AZPN)," First Call Company Estimate Profile: Aspen Technology (AZPN)—First Call, http://www.corp.powerize.com/EC/2000/08/25/doc6.html, pp. 3, Aug. 25, 2000.

Unknown, "Aspen Technology, Inc.," Hoover's Online, Aspen Technology, Inc. Capsule—Hoover's Online, http://www.hoovers.com/co/capsule/7/0,2163,42227,00..html, pp. 2, Aug. 25, 2000.

P. Litwin, "Fundamentals of Relational Database Design," Microsoft TechNet, http://www.microsoft.com/TechNet/Access/technote/ac101.asp?a=printable, pp. 18, Sep. 7, 2000.

Unknown, Feature Comparison Chart, pp. 8, Sep. 6, 2000.

Notification of Transmittal of the International Search Report or Declaration, 5 pages, Aug. 2, 2001.

* cited by examiner

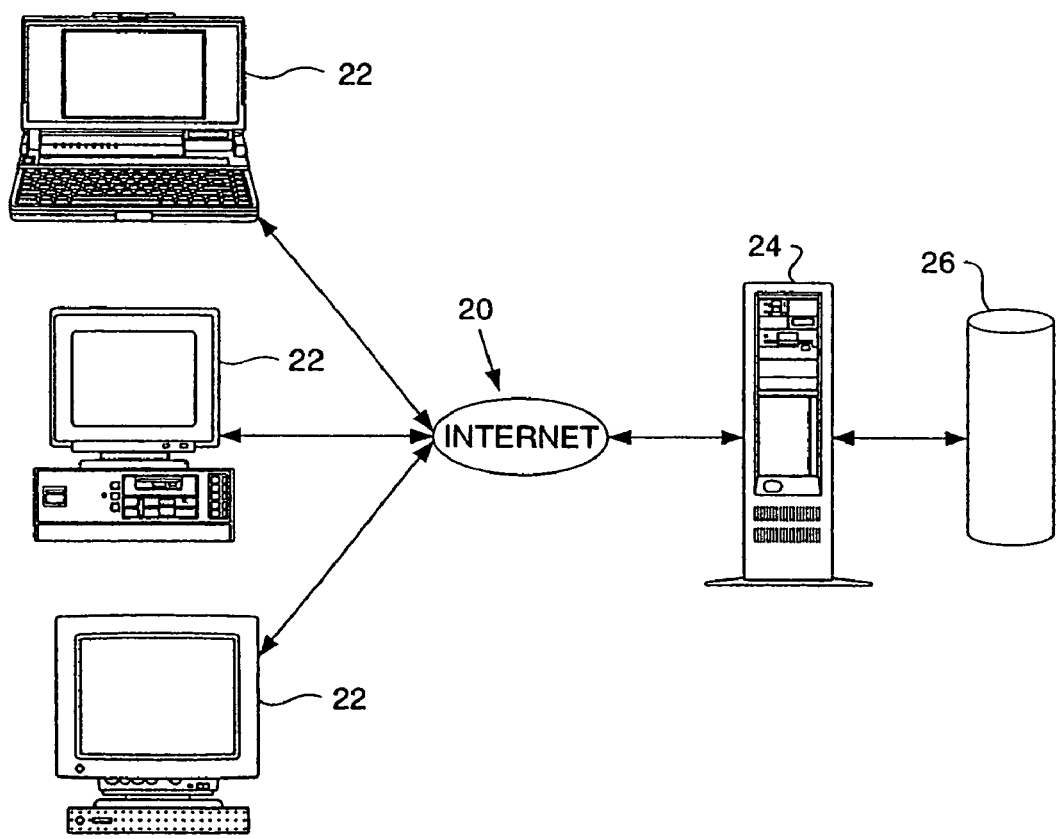

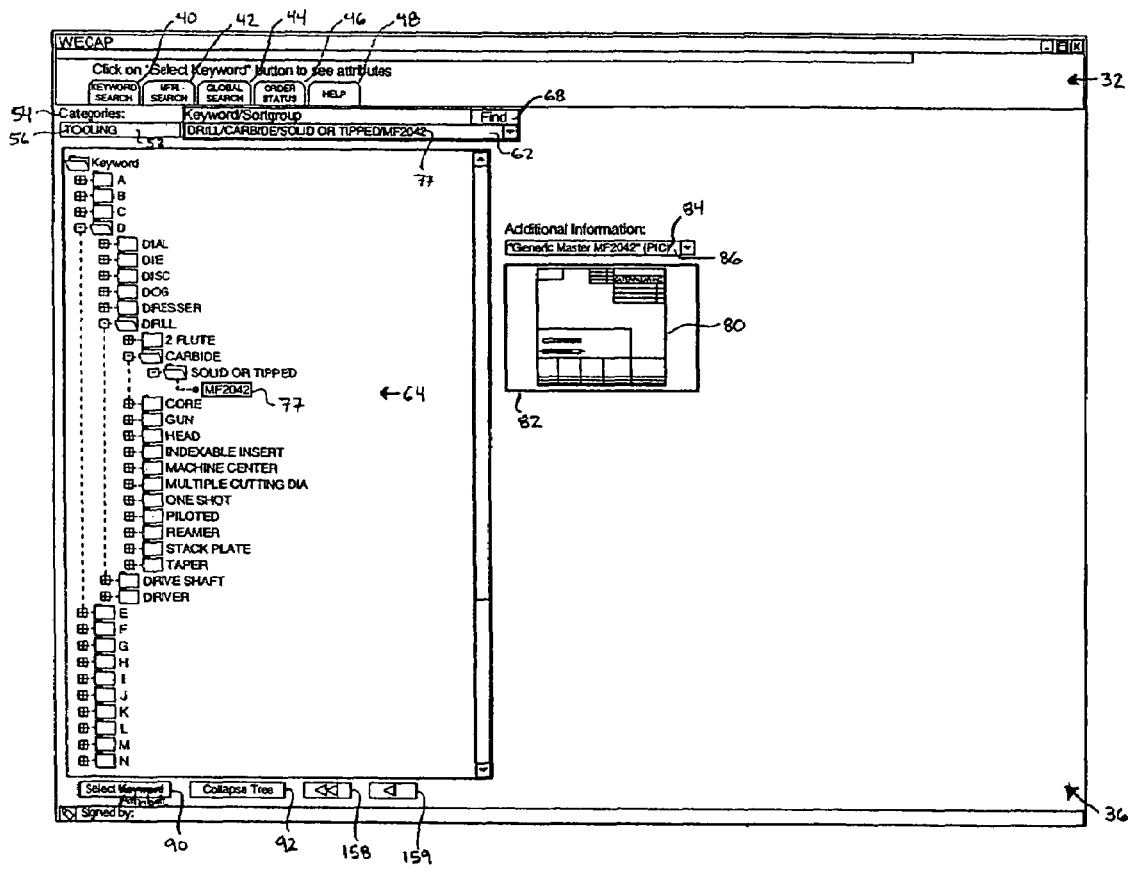
Fig_3d_

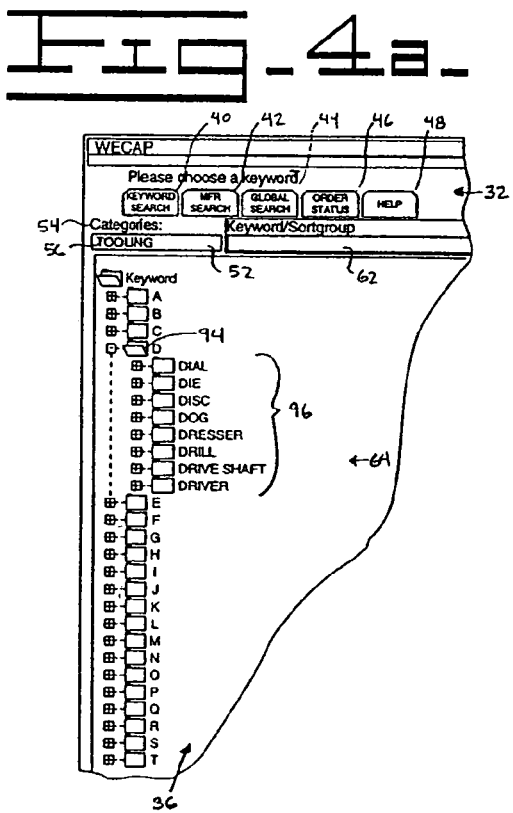
Fig-4a-
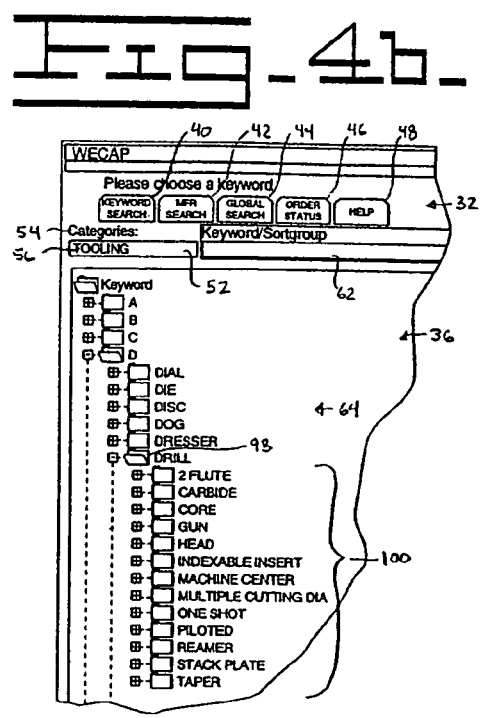
Fig-4b-
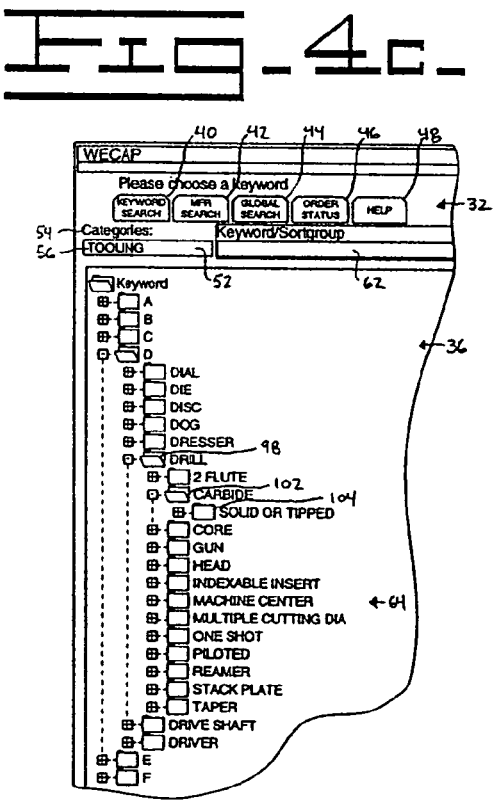
Fig-4c-
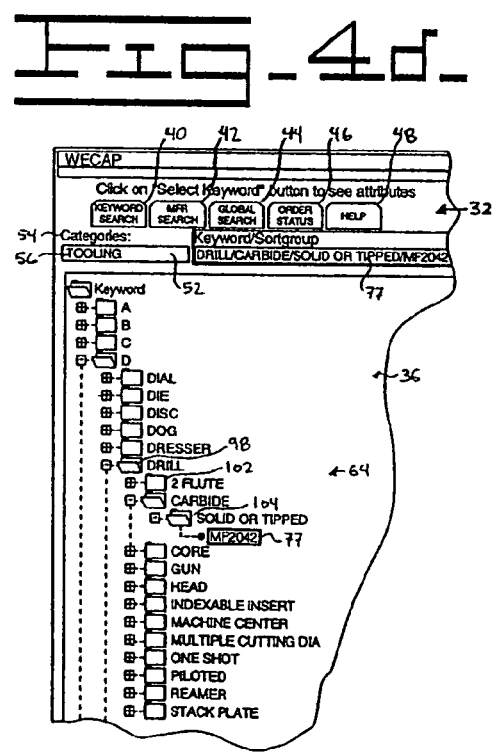
Fig-4d-

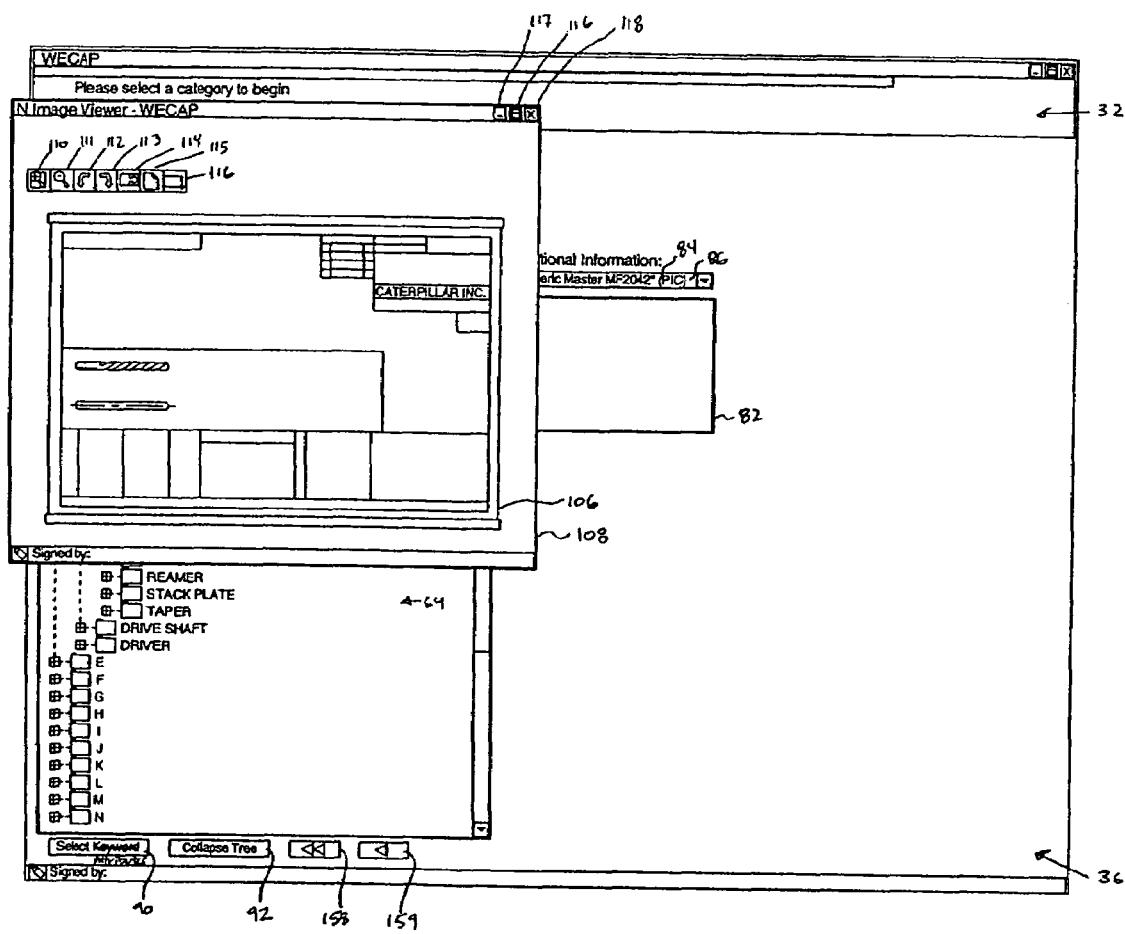

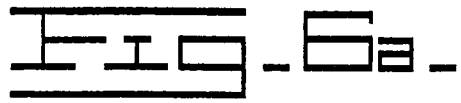
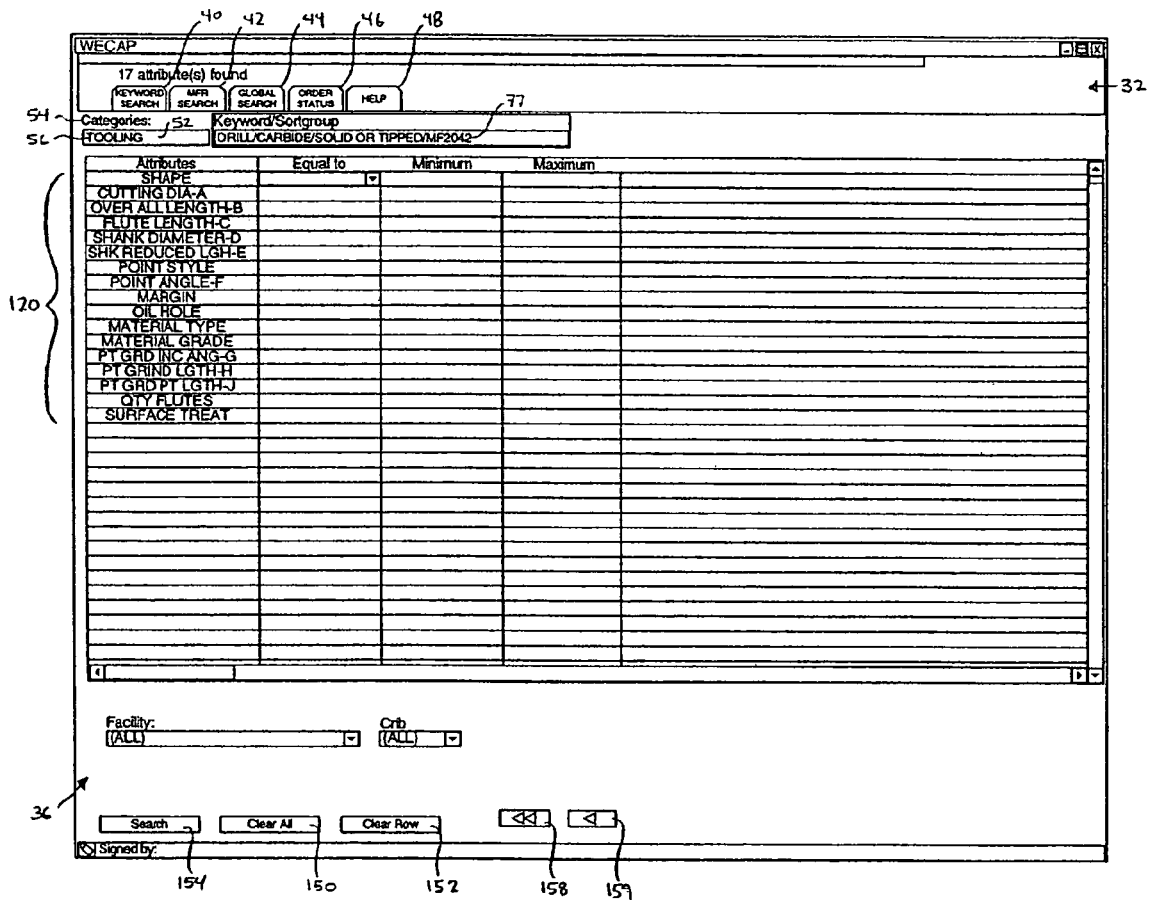

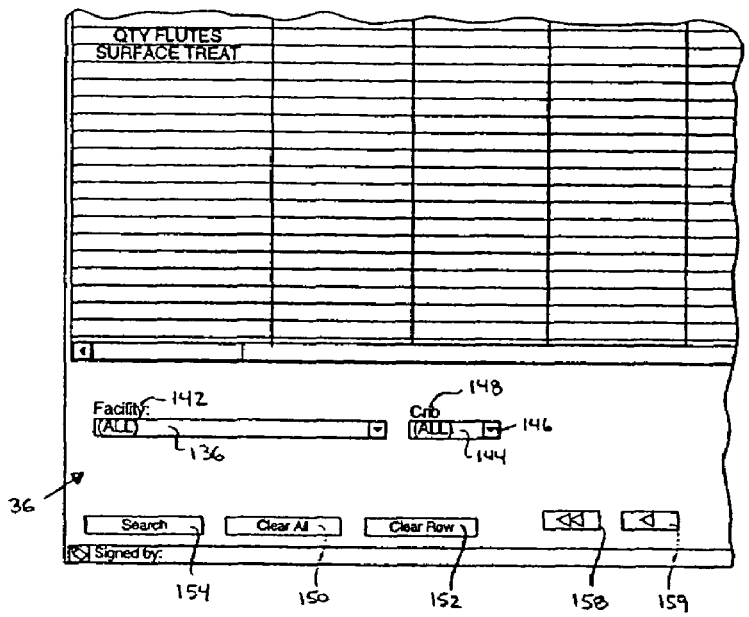
Fig_6e_
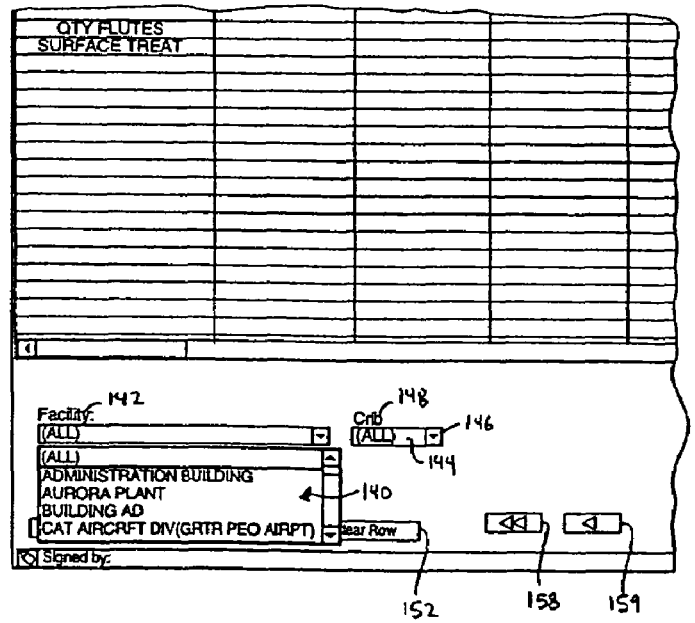
Fig_6f_

Fig. 7a.

| PART NO. | SHAPE | CUTTING DIA-A | OVERALL LENGTH-B | FLUTE LENGTH-C | SHANK DIAMETER-D | SHK REDUCED LGH-E | POINT |
|---|---|---|---|---|---|---|---|
| 0020420411 | 1.0000 | 1.2000 | 30.0000 | 13.0000 | 1.5000 | | |
| 0020378942 | 1.0000 | 1.2000 | 38.1000 | 19.1000 | 1.2000 | | |
| 0020420284 | 1.0000 | 1.3400 | 49.0000 | 4.0000 | 3.1800 | | |
| 0020420415 | 1.0000 | 1.4000 | 50.8000 | 15.0000 | 1.4000 | | 1.00 |
| 0020384374 | 1.0000 | 1.4200 | 50.8000 | 25.4000 | 1.4200 | | 1.00 |
| 0020376682 | 1.0000 | 1.6000 | 38.2000 | 19.1000 | 1.6000 | | 1.00 |
| 0020420271 | 1.0000 | 1.6990 | 38.1000 | 9.7000 | 3.1700 | | 1.00 |
| 0020420147 | 1.0000 | 1.7000 | 43.0000 | 20.0000 | 1.7000 | | 2.00 |
| 0020420266 | 1.0000 | 1.7090 | 39.9000 | 11.9000 | 1.7000 | | 1.00 |
| 0020420536 | 1.0000 | 10.0000 | 101.6000 | 47.6000 | 10.0000 | | |
| 0020420442 | 1.0000 | 10.0000 | 114.3000 | 73.0000 | 10.0000 | | |
| 0020420446 | 1.0000 | 10.0000 | 114.3000 | 73.0000 | 10.0000 | | |
| 0020420021 | 1.0000 | 10.0000 | 136.0000 | 80.0000 | 10.0000 | 1.0000 | 1.00 |
| 0020373832 | 1.0000 | 10.0000 | 75.0000 | 38.0000 | 10.0000 | | 1.00 |
| 0020382362 | 1.0000 | 10.0000 | 90.5000 | 43.5000 | 16.0000 | 40.0000 | |
| 0020420412 | 1.0000 | 10.3000 | 139.5000 | 75.6000 | 12.0000 | | |
| 0020420462 | 1.0000 | 10.3200 | 112.0000 | 66.0000 | 10.3200 | | |
| 0020420222 | 1.0000 | 10.3200 | 128.0000 | 78.0000 | 15.8750 | | |
| 0020420257 | 1.0000 | 10.5000 | 108.4000 | 61.4000 | 16.0000 | 40.0000 | |
| 0020420444 | 1.0000 | 10.5000 | 114.3000 | 73.0000 | 10.5000 | | |
| 0020420527 | 1.0000 | 10.5000 | 118.0000 | 71.0000 | 12.0000 | | |
| 0020363318 | 1.0000 | 10.5000 | 140.0000 | 80.0000 | 16.0000 | | 1.00 |
| 0020420158 | 1.0000 | 10.5000 | 140.0000 | 80.0000 | 16.0000 | | 1.00 |
| 0020420122 | 1.0000 | 10.5000 | 149.0000 | 84.0000 | 11.0000 | | 1.00 |
| 0020420195 | 1.0000 | 10.5000 | 152.0000 | 76.0000 | 10.5000 | | 1.00 |
| 0020420068 | 1.0000 | 10.5000 | 184.0000 | 117.0000 | 10.5000 | | 1.00 |
| 0020420357 | 1.0000 | 10.5000 | 85.7000 | 50.8000 | 10.5000 | | 2.00 |

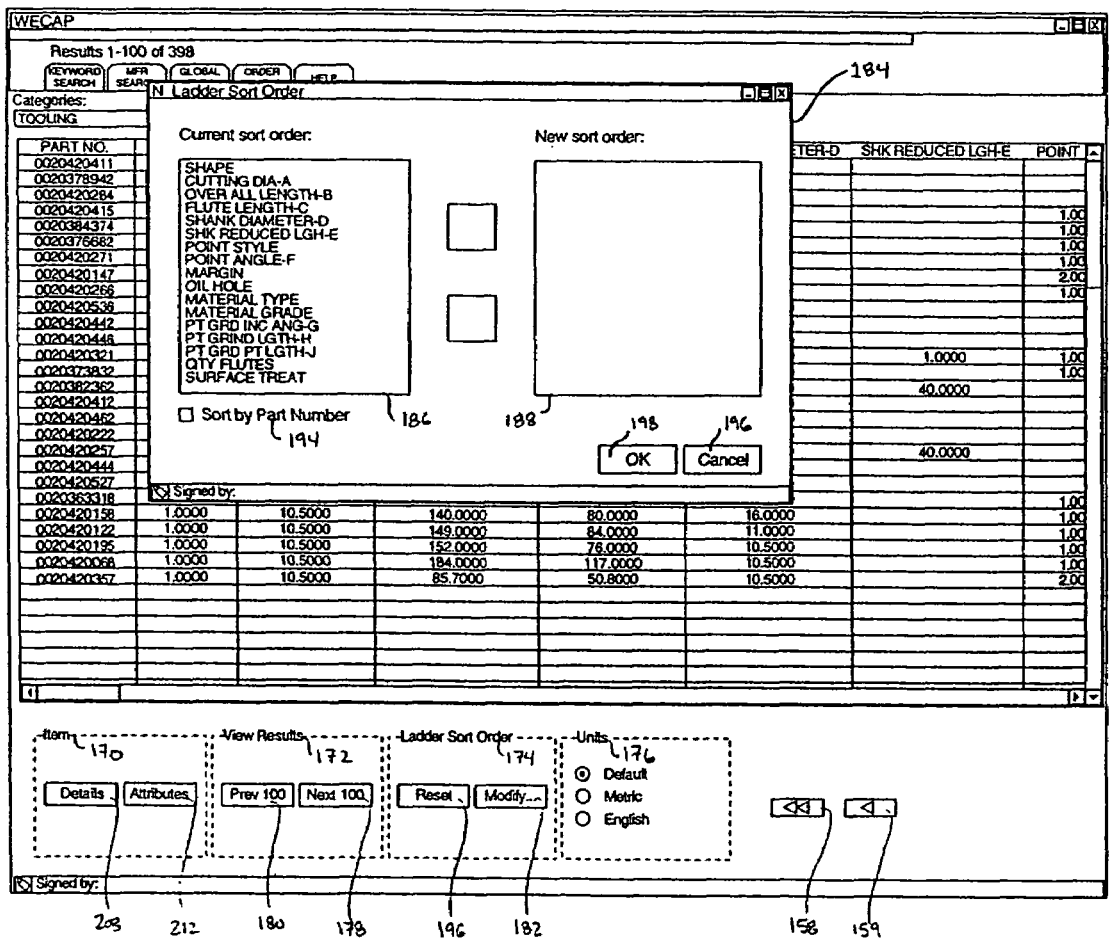

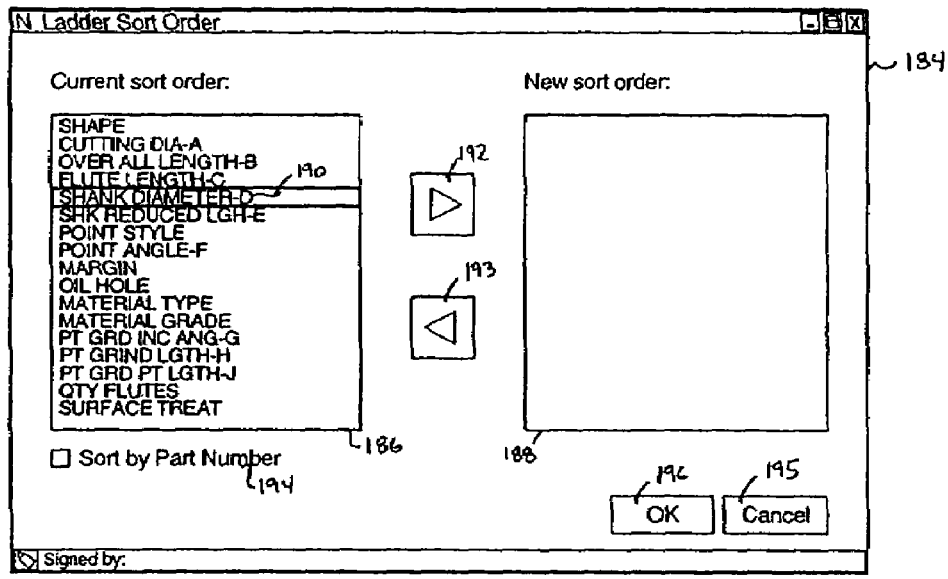
Fig_7c_
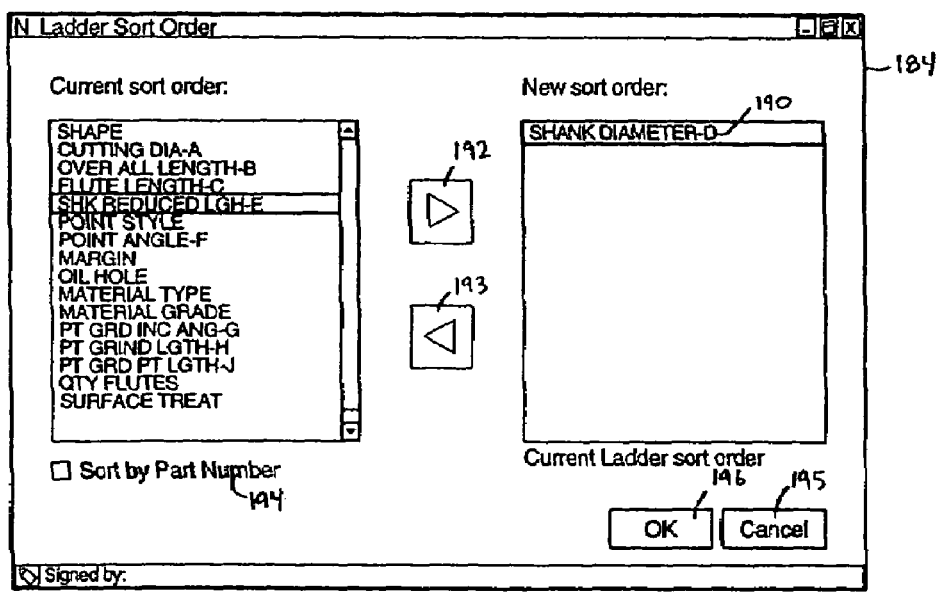
Fig_7d_

Fig_7e_

| PART NO. | SHANK DIAMETER-D | SHAPE | CUTTING DIA-A | OVERALL LENGTH-B | FLUTE LENGTH-C | SHK REDUCED LGH-E | POINT |
|---|---|---|---|---|---|---|---|
| 0020378942 | 1.2000 | 1.0000 | 1.2000 | 38.1000 | 19.1000 | | |
| 0020420415 | 1.4000 | 1.0000 | 1.4000 | 50.8000 | 15.0000 | | |
| 0020384374 | 1.4200 | 1.0000 | 1.4200 | 50.8000 | 25.4000 | | 1.00 |
| 0020420411 | 1.5000 | 1.0000 | 1.2000 | 30.0000 | 13.0000 | | 1.00 |
| 0020376682 | 1.6000 | 1.0000 | 1.6000 | 38.2000 | 19.1000 | | |
| 0020420147 | 1.7000 | 1.0000 | 1.7000 | 43.0000 | 20.0000 | | 1.00 |
| 0020420266 | 1.7000 | 1.0000 | 1.7000 | 39.3000 | 11.9000 | | 2.00 |
| 0020420536 | 10.0000 | 1.0000 | 10.0000 | 101.6000 | 47.6000 | | 1.00 |
| 0020420442 | 10.0000 | 1.0000 | 10.0000 | 114.3000 | 73.0000 | | |
| 0020420448 | 10.0000 | 1.0000 | 10.0000 | 114.3000 | 73.0000 | | |
| 0020420321 | 10.0000 | 1.0000 | 10.0000 | 136.0000 | 80.0000 | 1.0000 | 1.00 |
| 0020373832 | 10.0000 | 1.0000 | 10.0000 | 75.0000 | 38.0000 | | 1.00 |
| 0020420402 | 10.0000 | 1.0000 | 8.2000 | 101.8000 | 47.8000 | 40.0000 | |
| 0020420532 | 10.0000 | 1.0000 | 8.7000 | 10.3000 | 61.0000 | | |
| 0020420537 | 10.0000 | 1.0000 | 9.0000 | 103.0000 | 61.0000 | 40.0000 | |
| 0020420287 | 10.0000 | 1.0000 | 9.2000 | 136.0000 | 80.0000 | | |
| 0020420114 | 10.0000 | 1.0000 | 8.5000 | 135.0000 | 76.0000 | | 1.00 |
| 0020420126 | 10.0000 | 1.0000 | 9.6000 | 145.0000 | 80.0000 | | 1.00 |
| 0020420547 | 10.0000 | 1.0000 | 9.7000 | 151.0000 | 103.3000 | | 1.00 |
| 0020420417 | 10.0000 | | 8.1000 | 102.0000 | 52.0000 | | 1.00 |
| 0020385155 | 10.0063 | 1.0000 | 8.7000 | 102.0000 | 58.0000 | | 1.00 |
| 0020780101 | 10.3120 | 2.0000 | 11.1130 | 139.7000 | 76.2000 | 127.0000 | |
| 0020420468 | 10.3200 | 1.0000 | 10.3200 | 112.0000 | 68.0000 | | |
| 0020420444 | 10.5000 | 1.0000 | 10.5000 | 114.3000 | 73.0000 | | |
| 0020420195 | 10.5000 | 1.0000 | 10.5000 | 152.0000 | 78.0000 | | 1.00 |
| 0020420066 | 10.5000 | 1.0000 | 10.5000 | 184.0000 | 117.0000 | | 1.00 |
| 0020420357 | 10.5000 | 1.0000 | 10.5000 | 85.7000 | 50.8000 | | 2.00 |

Fig. 7f.

| PART NO. | CUT DIA-A | OVERALL LENGTH-B | SHANK DIA-C | SHANK LENGTH-D | TIP LENGTH-E | FLUTE LENGTH-F | PNT |
|---|---|---|---|---|---|---|---|
| 0019459262 | .8071 | 11.8700 | .8750 | 3.5000 | 2.2800 | 8.4500 | 2.00 |
| 0019456992 | .8125 | 15.5000 | 1.0000 | 3.5000 | 1.7500 | 11.5000 | 2.00 |
| 0019454812 | .8280 | 19.0000 | 1.4995 | 4.0000 | 2.0000 | 14.7500 | 2.00 |
| 0019458472 | .8550 | 12.0000 | 1.0000 | 3.0000 | 2.0000 | 8.5000 | 2.00 |
| 0019454002 | .8735 | 20.0000 | 1.4998 | 4.0000 | 3.0000 | 14.7500 | 2.00 |
| 0019457302 | .9375 | 16.0000 | 1.0000 | 3.5000 | 2.0000 | 11.5000 | 2.00 |
| 0019458042 | .9380 | 14.0000 | 1.4998 | 4.0000 | 2.0000 | 9.7500 | 2.00 |
| 0019454802 | .9380 | 19.0000 | 1.4998 | 4.0000 | 3.0000 | 13.7500 | 2.00 |
| 0019456282 | .9531 | 32.0000 | .9996 | 2.7500 | 1.5000 | 28.7500 | 2.00 |
| 0019457752 | .9601 | 20.0000 | 1.2500 | 3.5000 | 3.0000 | 15.0000 | 2.00 |
| 0019454392 | 1.0000 | 17.0000 | 1.4998 | 4.0000 | 2.0000 | 12.5000 | 2.00 |
| 0019458132 | 1.0039 | 13.8800 | .9998 | 5.5700 | 3.0000 | 8.3100 | 2.00 |
| 0019457922 | 1.0625 | 10.0000 | 1.0000 | 3.5000 | 2.4400 | 5.5000 | 2.00 |
| 0019457312 | 1.0625 | 16.0000 | 1.0000 | 3.5000 | 2.0000 | 11.5000 | 2.00 |
| 0019454862 | 1.0625 | 19.0000 | 1.4998 | 4.0000 | 2.2500 | 14.0000 | 2.00 |
| 0019457742 | 1.0851 | 20.0000 | 1.2500 | 3.5000 | 3.0000 | 15.0000 | 2.00 |
| 0019459287 | 1.2600 | 10.5000 | 1.4998 | 3.0000 | 2.0400 | 7.5000 | 2.00 |
| 0019459315 | 11.0000 | 558.8000 | 19.0470 | 69.9000 | 45.2000 | 482.6000 | 2.00 |
| 0019458962 | 11.5000 | 279.4000 | 25.4000 | 88.9000 | 28.4000 | 177.8000 | 2.00 |
| 0019459272 | 14.0000 | 266.7000 | 25.4000 | 88.9000 | 38.1000 | 165.0000 | 2.00 |
| 0019459252 | 14.5000 | 266.7000 | 25.4000 | 63.5000 | 63.5000 | 190.5000 | 2.00 |
| 0019458502 | 14.5000 | 304.8000 | 25.3950 | 76.2000 | 38.1000 | 215.9000 | 2.00 |
| 0019459246 | 15.0000 | 340.0000 | 25.4000 | 60.0000 | 25.4000 | 267.2000 | 2.00 |
| 0019459247 | 16.7500 | 390.0000 | 25.4000 | 60.0000 | 25.4000 | 317.2000 | 2.00 |
| 0019458812 | 17.0000 | 400.0000 | 25.4000 | 101.6000 | 17.5000 | 279.4000 | 2.00 |
| 0019459222 | 17.0000 | 400.0000 | 25.4000 | 101.6000 | 36.5000 | 285.8000 | 2.00 |
| 0019458732 | 18.2500 | 307.4000 | 22.2250 | 88.9000 | 57.9000 | 218.0000 | 2.00 |

Fig_7g.

Fig_7h.

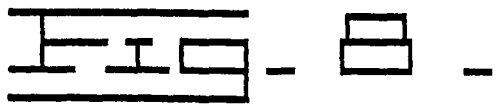
Fig. 8.
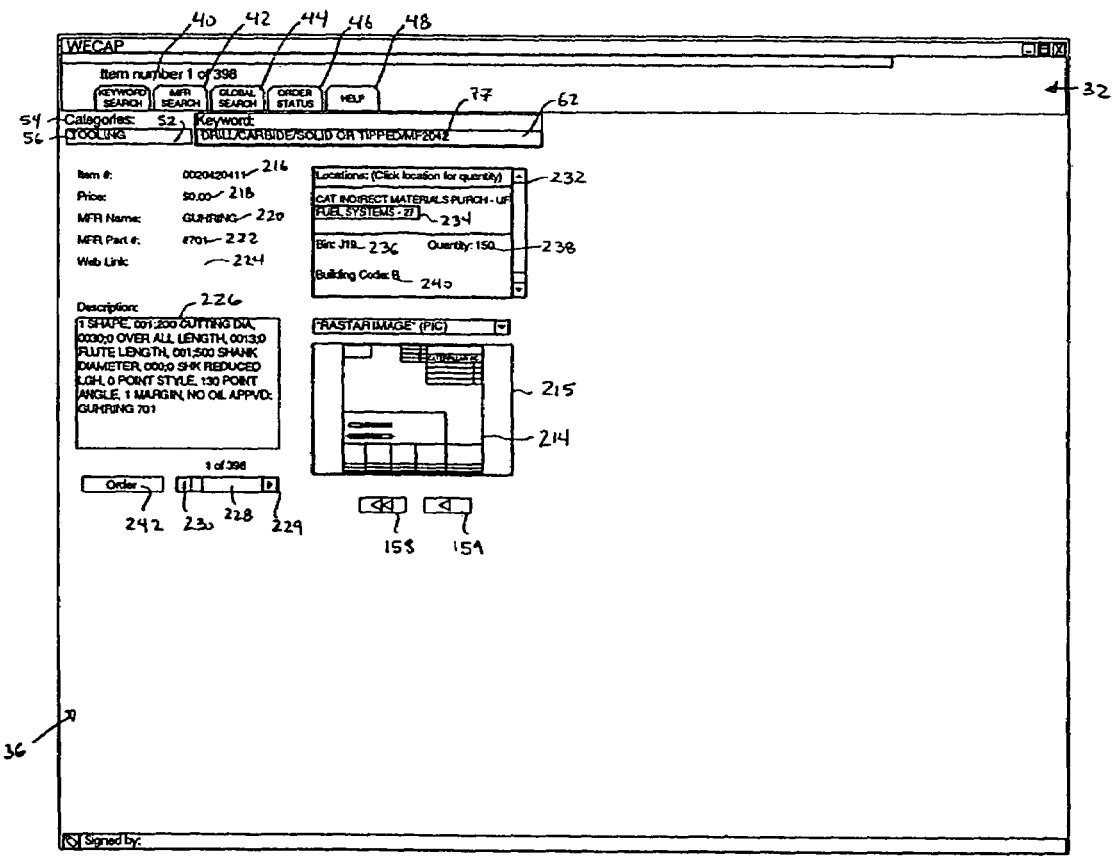

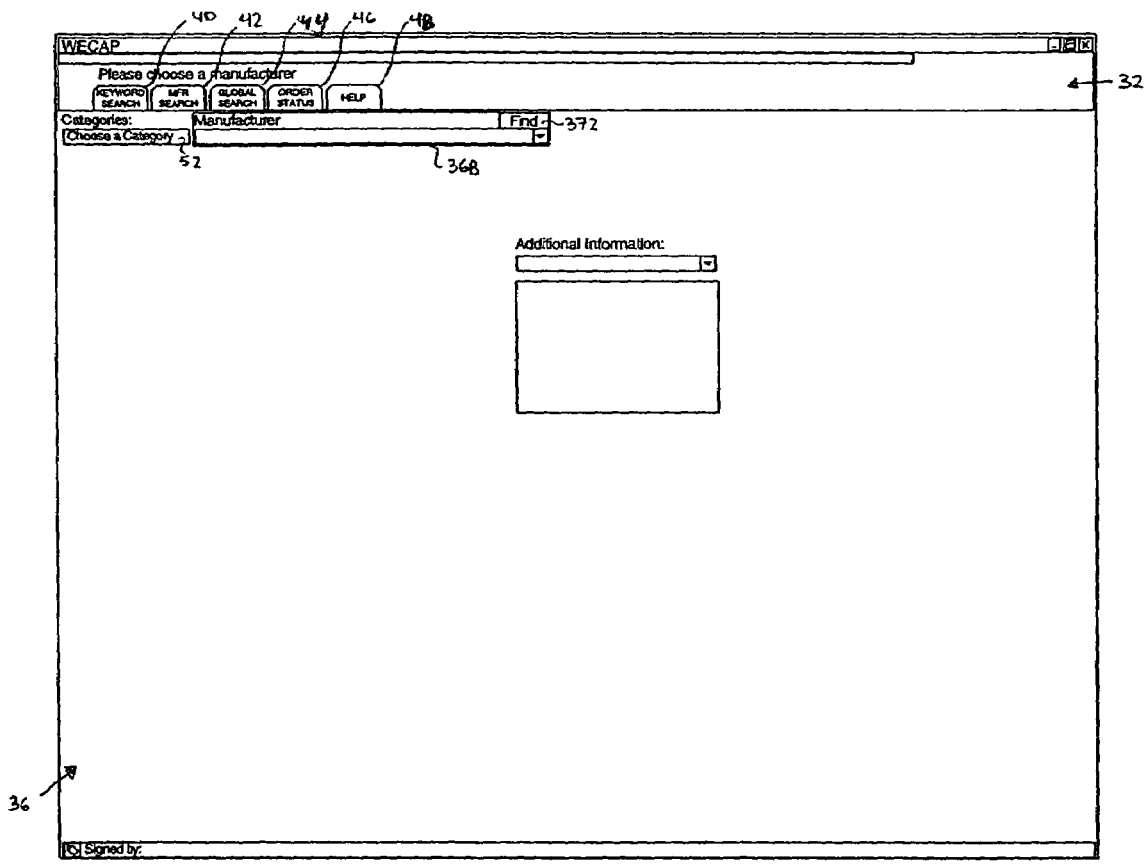
Fig_12a_

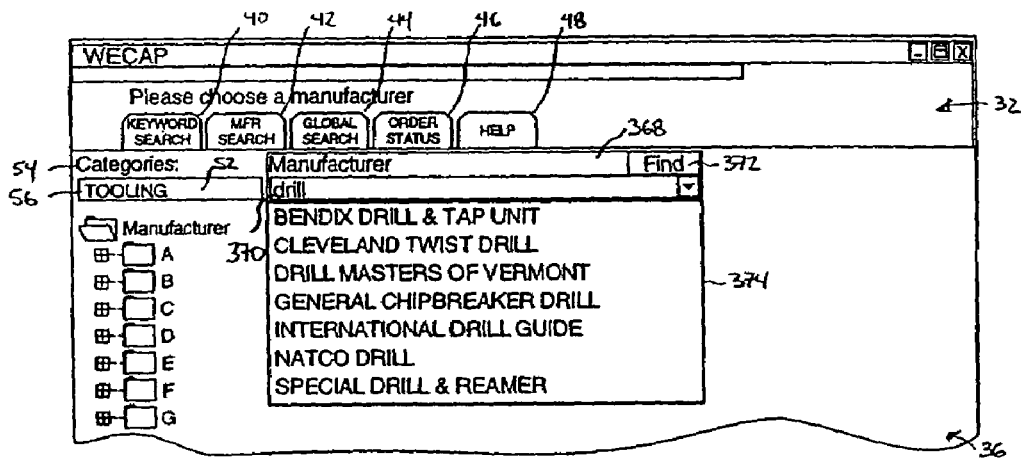
Fig_12b_

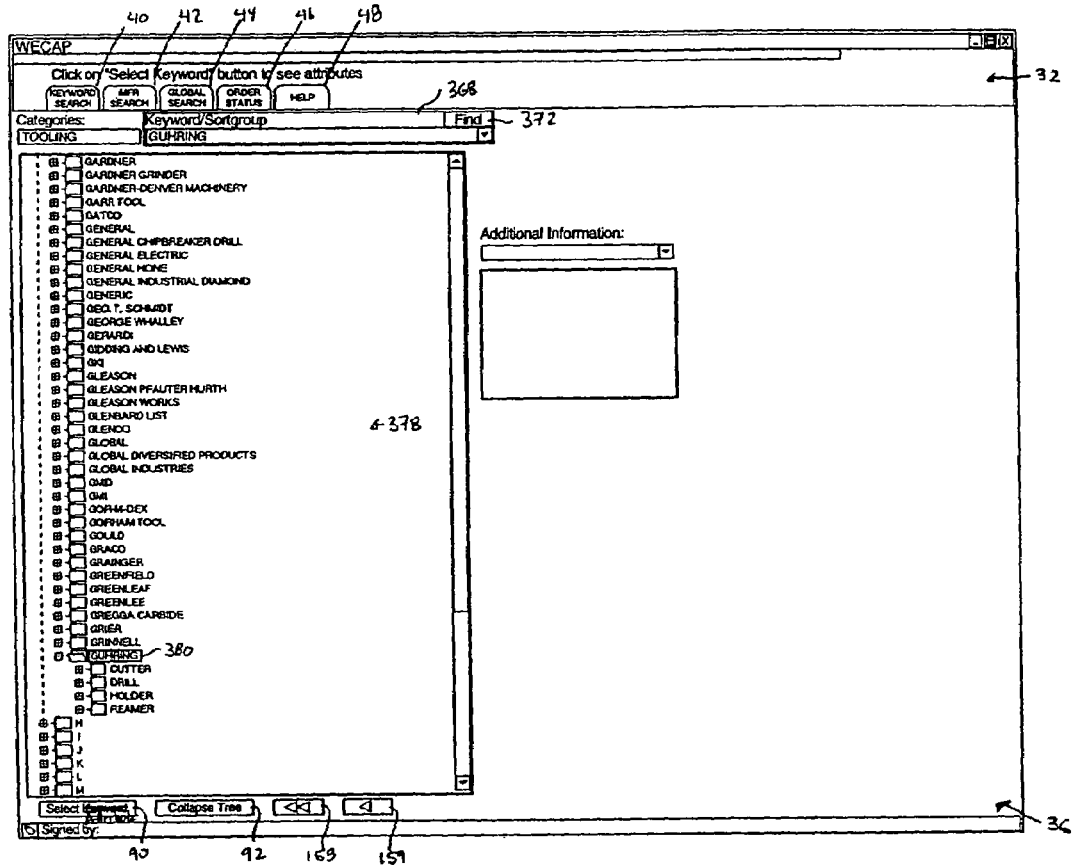
Fig_12c_
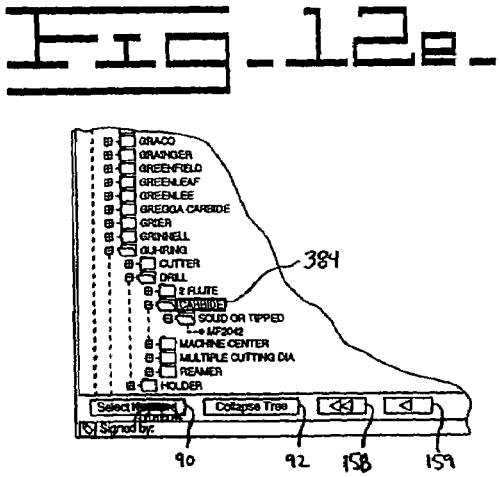
Fig_12d_
Fig_12e_

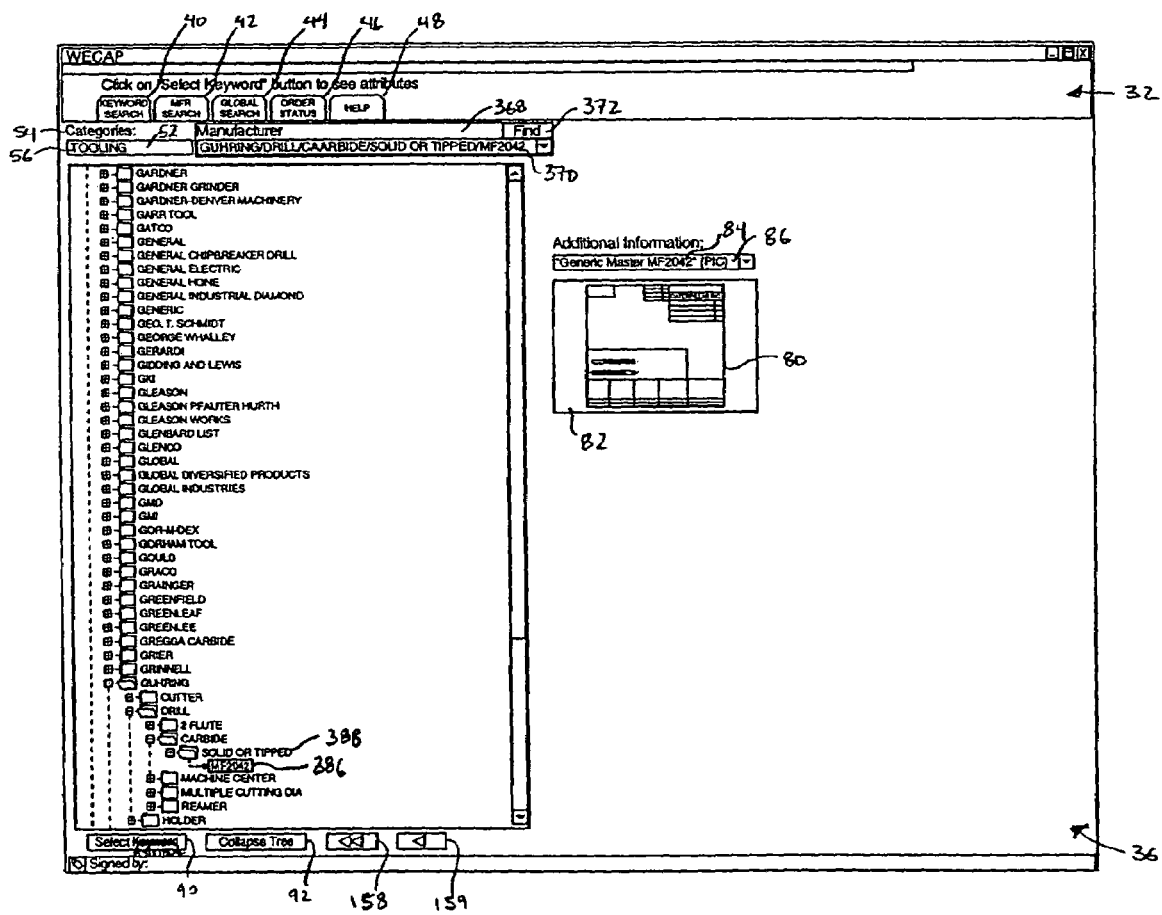
Fig_12f.

Fig_12g.

| PART NO. | SHAPE | CUTTING DIA-A | OVERALL LENGTH-B | FLUTE LENGTH-C | SHANK DIAMETER-D | SHK REDUCED LGH-E | POINT STYLE | POINT |
|---|---|---|---|---|---|---|---|---|
| 0020420411 | 1.0000 | 1.2000 | 30.0000 | 13.0000 | 1.5000 | | | 130 |
| 0020420147 | 1.0000 | 1.7000 | 43.0000 | 20.0000 | 1.7000 | | 2.0000 | 118 |
| 0020373832 | 1.0000 | 10.0000 | 75.0000 | 33.0000 | 10.0000 | | 1.0000 | 118 |
| 0020420092 | 1.0000 | 11.2000 | 95.0000 | 47.0000 | 11.2000 | | 1.0000 | 150 |
| 0020420135 | 1.0000 | 12.8000 | 102.0000 | 51.0000 | 12.8000 | | 1.0000 | 150 |
| 0020420231 | 1.0000 | 14.2900 | 145.0000 | 95.0000 | 16.0000 | | 1.0000 | 140 |
| 0020420265 | 1.0000 | 2.5000 | 45.0000 | 15.0000 | 2.5000 | | 1.0000 | 130 |
| 0020420007 | 1.0000 | 2.9000 | 46.0000 | 16.0000 | 2.9000 | | 1.0000 | 118 |
| 0020420008 | 1.0000 | 3.2000 | 49.0000 | 18.0000 | 3.2000 | | 1.0000 | 118 |
| 0020420496 | 1.0000 | 3.2400 | 49.0000 | 24.0000 | 3.2400 | | 1.0000 | 150 |
| 0020373912 | 1.0000 | 4.5000 | 50.0000 | 25.0000 | 4.5000 | | 1.0000 | 118 |
| 0020420021 | 1.0000 | 4.6000 | 58.0000 | 24.0000 | 4.6000 | | 1.0000 | 118 |
| 0020378712 | 1.0000 | 4.8000 | 50.0000 | 25.0000 | 4.8000 | | 1.0000 | 118 |
| 0020373852 | 1.0000 | 4.9000 | 50.0000 | 25.0000 | 4.9000 | | 1.0000 | 118 |
| 0020373892 | 1.0000 | 5.2000 | 50.0000 | 25.0000 | 5.2000 | | 1.0000 | 118 |
| 0020376722 | 1.0000 | 6.0000 | 50.0000 | 25.0000 | 6.0000 | | 1.0000 | 118 |
| 0020420405 | 1.0000 | 6.9000 | 77.7000 | 32.0000 | 8.0000 | 37.0000 | 1.0000 | 150 |
| 0020420142 | 1.0000 | 8.2000 | 79.0000 | 37.0000 | 8.2000 | | 1.0000 | 150 |
| 0020420094 | 1.0000 | 9.4000 | 84.0000 | 40.0000 | 9.4000 | | 1.0000 | 150 |
| 0020420014 | 1.0000 | 9.5000 | 84.0000 | 40.0000 | 9.5000 | | 1.0000 | 140 |
| 0020101802 | 2.000 | 20.0000 | 131.0000 | 40.0000 | 20.0000 | | | 80 |
| 0020379002 | | | | | | | | |
| 0020377452 | | | | | | | | |
| 0020379512 | | | | | | | | |

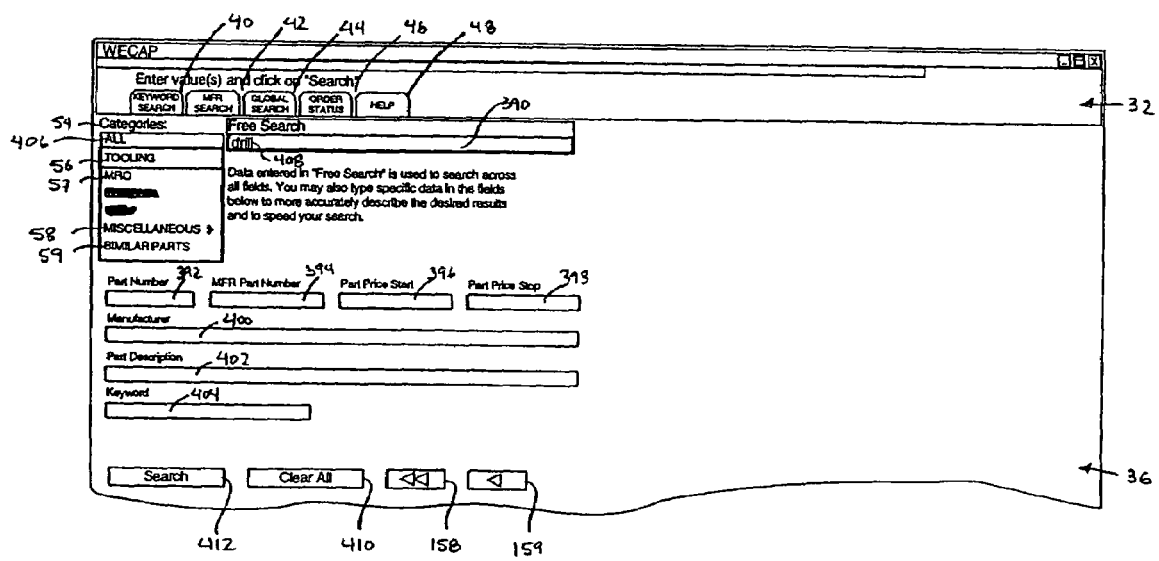
Fig_13b_

Fig_13c

| PART NO. | RANK (MAX*****) | CATEGORIES | KEYWORD | DESCRIPTION |
|---|---|---|---|---|
| 0001100292 | ***** | TOOLING | MF2379 | 0.593 DRILL SIZE, 0.828 BIT OD, 2.00 OVERALL LENGTH, HSS MATERIAL TYPE, STD MATERIAL, GRAD |
| 0001100342 | ***** | TOOLING | MF2379 | 08:20 DRILL SIZE, 15:88 BIT OD, 39:7 OVERALL LENGTH, HSS MATERIAL TYPE, STD MATERIAL, GRAD APPRVD |
| 0001100772 | ***** | TOOLING | MF2379 | 22:50 DRILL SIZE, 49:53 BIT OD, 73:7 OVERALL LENGTH, HSS MATERIAL TYPE, M-2 MATERIAL GRADREF: DEC |
| 0001100782 | ***** | TOOLING | MF2379 | 18.75 DRILL SIZE, 43.82 BIT OD, 73:7 OVERALL LENGTH, HSS MATERIAL TYPE, M-2 MATERIAL GRADREF: DEC |
| 0001100802 | ***** | TOOLING | MF2379 | 13:80 DRILL SIZE, 41:28 BIT OD, 73:7 OVERALL LENGTH, HSS MATERIAL TYPE, M-2 MATERIAL GRADREF: DEC |
| 0001100812 | ***** | TOOLING | MF2379 | 11.00 DRILL SIZE, 38:10 BIT OD, 73.7 OVERALL LENGTH, HSS MATERIAL TYPE, M-2 MATERIAL GRADREF: DEC |
| 0001100842 | ***** | TOOLING | MF2379 | 08:20 DRILL SIZE, 35:18 BIT OD, 72:2 OVERALL LENGTH, HSS MATERIAL TYPE, M-2 MATERIAL GRADREF: DEC |
| 0001100872 | ***** | TOOLING | MF2379 | 13.50 DRILL SIZE, 38:10 BIT OD, 44:5 OVERALL LENGTH, HSS MATERIAL TYPE, M-2 MATERIAL GRADREF: DEC |
| 0001100882 | ***** | TOOLING | MF2379 | 17:50 DRILL SIZE, 44:45 BIT OD, 50:6 OVERALL LENGTH, HSS MATERIAL TYPE, M-2 MATERIAL GRADREF: DEC |
| 0001100892 | ***** | TOOLING | MF2379 | 11.00 DRILL SIZE, 38:10 BIT OD, 44:5 OVERALL LENGTH, HSS MATERIAL TYPE, M-2 MATERIAL GRADREF: DEC |
| 0001100902 | ***** | TOOLING | MF2379 | 14:00 DRILL SIZE, 38:10 BIT OD, 44:5 OVERALL LENGTH, HSS MATERIAL TYPE, M-2 MATERIAL GRADREF: DEC |
| 0001100912 | ***** | TOOLING | MF2379 | 20:50 DRILL SIZE, 44:45 BIT OD, 63:5 OVERALL LENGTH, HSS MATERIAL TYPE, M-2 MATERIAL GRADREF: DEC |
| 0001100915 | ***** | TOOLING | MF2379 | 17:00 DRILL SIZE, 44:45 BIT OD, 50:8 OVERALL LENGTH, HSS MATERIAL TYPE, M-2 MATERIAL GRADREF: DEC |
| 0001100917 | ***** | TOOLING | MF2379 | 11.00 DRILL SIZE, 15:88 BIT OD, 39:7 OVERALL LENGTH, HSS MATERIAL TYPE, STD MATERIAL GRAD APPRVD |
| 0001100921 | ***** | TOOLING | MF2379 | 13.80 DRILL SIZE, 20:62 BIT OD, 46:0 OVERALL LENGTH, HSS MATERIAL TYPE, STD MATERIAL GRAD APPRVD |
| 0001100922 | ***** | TOOLING | MF2379 | 17.00 DRILL SIZE, 25:40 BID OD, 57:2 OVERALL LENGTH, HSS MATERIAL TYPE, STD MATERIAL GRAD APPRVD |
| 0001100932 | ***** | TOOLING | MF2379 | BIT, DRILL, 10.0 TO 12.0 MM DRILL RANGE 90 DEG INCL ANGLE, 38.00 DIA, BODY, 32.00 DIA, S SHK, 133.0 OAL |
| 0001100934 | ***** | TOOLING | MF2379 | 14:00 DRILL SIZE, 40:00 BIT OD, 00:0 OVERALL LENGTH, TIN MATERIAL TYPE, C-5 MATERIAL GRAD APPROVED |
| 0001100935 | ***** | TOOLING | MF2379 | 16:00 DRILL SIZE, 42:00 BIT OD, 00:0 OVERALL LENGTH, TIN MATERIAL TYPE, C-5 MATERIAL GRAD APPROVED |
| 0001100938 | ***** | TOOLING | MF2379 | 16.00 DRILL SIZE, 42:00 BIT OD, 00:0 OVERALL LENGTH, TIN MATERIAL TYPE, C-5 MATERIAL GRAD APPROVED |
| 0019234332 | ***** | TOOLING | MF2035 | SGL SHAPE, 0.538 BODY DIAMETER, 0.2500 DRILL DIAMETER, 0.250 DRILL LENGTH, 03.13 OVERALL LENGTH |
| 0019282542 | ***** | TOOLING | MF2060 | 1.4688 CUT DIAMETER, 14.88 OVERALL LENGTH, 04 SHANK NO, MT SHANK TYPE, 0.000 SHANK DIA, HSS MAT |
| 0019324422 | ***** | TOOLING | MF2060 | 0.4219 CUT DIAMETER, 07.25 OVERALL LENGTH, 00 SHANK NO, SS SHANK TYPE, 0.422 SHANK DIA, HSS MAT |
| 0019329735 | ***** | TOOLING | MF2060 | BROCA 4FL MM DIA 18:250 CC 75 CT 138 HASTE R 18:250 CUT DIAMETER, 138.0 OVERALL LENGTH, ET ANG |
| 0019706522 | ***** | TOOLING | MF2090 | 0.5877 SMALL DIA, 0.8661 LARGE DIA, 09.50 OVERALL LENGTH, 00.47 STEP LENGTH, 04.88 FLUTE LENGTH |
| 0019799792 | ***** | TOOLING | MF2090 | MULTIPLE CUTTING DIA .3900 SMAL DIA 0.6250 LARGE DIA 4.25 IN OAL MATL, HSS STD |
| 0019807582 | ***** | TOOLING | MF2090 | 06:800 SMALL DIA, 09:525 LARGE DIA, 11:43 OVERALL LENGTH, 0195 STEP LENGTH, 0143 FLUTE LENGTH |
| 0019811535 | ***** | TOOLING | MF2090 | 06:100 SMALL DIA, 09:000 LARGE DIA, 165.0 OVERALL LENGTH, 0360 STEP LENGTH, 0790 FLUTE LENGTH |
| 0020184372 | ***** | TOOLING | MF2055 | 3 SHAPE, 02:500 CUTTING DIA, 14.75 OVERALL LENGTH, 10.75 FLUTE LENGTH, 50 SHANK NO, VFLG SHANK |
| 0020187094 | ***** | TOOLING | MF2055 | 1 SHAPE, 000:00 CUTTING DIA, 126.0 OVERALL LENGTH, 095.0 FLUTE LENGTH, SHANK NO, SS SHANK TYPE |
| 0020187618 | ***** | TOOLING | MF2055 | 1 SHAPE, 031:10 CUTTING DIA, 128.0 OVERALL LENGTH, 095.0 FLUTE LENGTH, 50 SHANK NO, ABS SHANK |
| 0019234342 | ***** | TOOLING | MF2035 | SGL SHAPE, 1.000 BODY DIAMETER, 0.3120 DRILL DIAMETER, 0.312 DRILL LENGTH, 03.13 OVERALL LENGTH |
| 0019282652 | ***** | TOOLING | MF2060 | 1.5000 CUT DIAMETER, 06.62 OVER ALL LENGTH, 04 SHANK NO, MT SHANK TYPE, 0.000 SHANK DIA, HSS MAT |
| 0019324432 | ***** | TOOLING | MF2060 | 0.5312 CUT DIAMETER, 08:00 OVER ALL LENGTH, 00 SHANK NO, SS SHANK TYPE, 0.531 SHANK DIA, HSS MAT |
| 0019329736 | ***** | TOOLING | MF2060 | BROCA 4FL MM DIA 18:250 CC 75 CT 138 HASTE R 18:250 CUT DIAMETER, 138.0 OVERALL LENGTH, ET ANG |

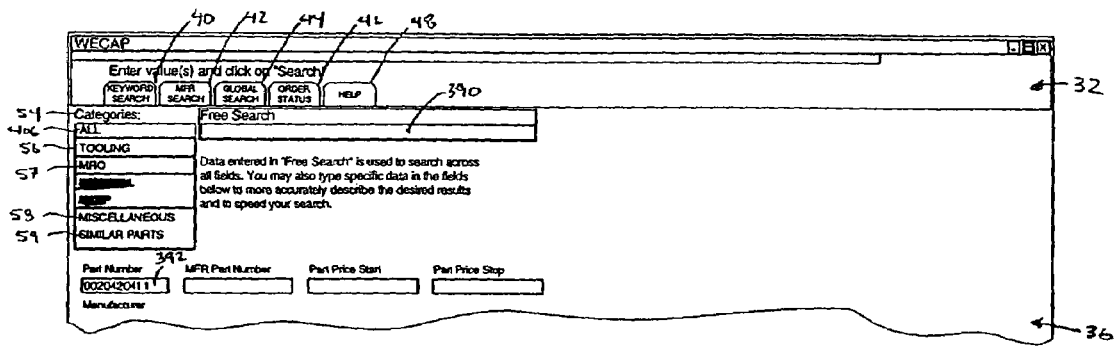
Fig_13d_
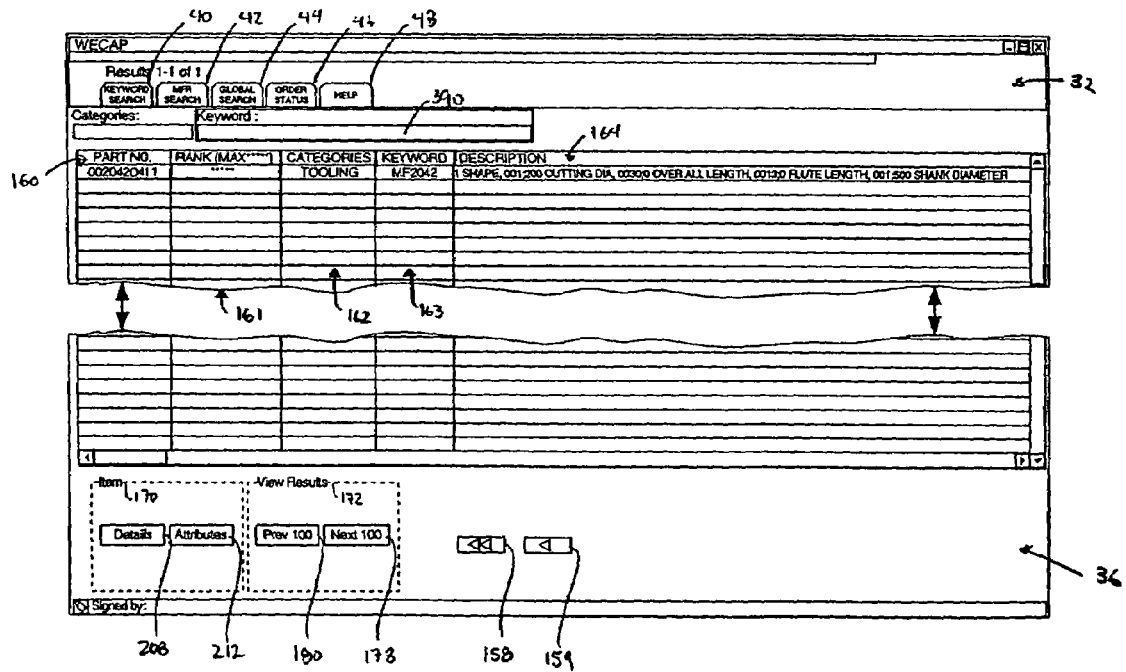
Fig_13e_

Fig. 13q.

| | |
|---|---|
| Item #: | 0020420411 ~422 |
| Category: | TOOLING —424 |
| Keyword: | MF2042 |
| | DRILL/CARBIDE/SOLID ORTIPPED/MF2042 |

| Characteristic | Value |
|---|---|
| SHAPE | 1.0000 |
| CUTTING DIA-A | 1.2000 |
| OVER ALL LENGTH-B | 30.0000 |
| FLUTE LENGTH-C | 13.0000 |
| SHANK DIAMETER-D | 1.5000 |
| SHK REDUCED LGH-E | |
| POINT STYLE | |
| POINT ANGLE-F | 130.0000 |
| MARGIN | 1.0000 |
| OIL HOLE | NO |
| MATERIAL TYPE | TC |
| MATERIAL GRADE | C-2 |
| PT GRD INC ANG-G | |
| PT GRIND LGTH-H | |
| PT GRD PT LGTH-J | .2800 |
| QTY FLUTES | 2.0000 |
| SURFACE TREAT | BRIGHT |

1 of 1

[ Details ] [ Cancel ] [◄ ▓▓▓▓▓▓ ►]

Signed by:

PARAMETRIC SEARCHING

This application claims priority to U.S. Provisional Application Ser. No. 60/205,602 filed on May 18, 2000, which is hereby incorporated in its entirety herein by reference.

TECHNICAL FIELD

The present invention relates generally to searching data such as in electronic commerce ("e-commerce") and more particularly to a system and method for performing parametric searching such as on a computer.

BACKGROUND ART

Currently, searching for items for procurement is a rather complex affair. Not only must a person know specific pieces of information about the item he wishes to find, he must also know how to properly input his request into a computer, so that the computer properly understands his request. It also happens that different procurement systems use different terminology and formatting so that a proper request on one procurement system will not be proper on another one. For example, a search done on one current e-commerce procurement system solution requires the following kind of formatting in order to return a proper search of a bolt with a ⅝" length and ¼" diameter head: bolt, len 0.625, diameter 0.25. This method, and similar types of methods are not very intuitive to a novice user, and allow for a significant number of formatting mistakes. A misspelled word or misplaced comma will cause a search to fail wasting valuable time, and causing needless frustration to a user.

As another example, if one wishes to search for a specific manufacturer's kind of bolt, the user must know the precise manufacturers' name or at least the code by which the procurement system refers to that manufacturer. If that information is inputted incorrectly, the search may very well come up empty and thus make the user think that the manufacturer doesn't make that kind of bolt. This, of course, may very well be not true because, for example, the user accidentally spelled the name of the manufacturer with a "c" instead of a "k", or inputted the improper code for that manufacturer and thus the search would not have any results for that misspelled manufacturer. The same undesired result might happen if the user did not know that the real name of the item in question did not have the name "bolt" in it (yet it was often referred to as a bolt). The system would report an empty result, yet the item is abundantly in stock.

Even if the user was correct about the name and type of item he is searching for, the list returned of possible matches could very well be unmanageable. Thus a typical search also includes other attribute characteristics of the item in question to narrow down the possible matches. A user must be familiar with terminology for the kinds of attribute characteristics of an item to help narrow down the results. For instance, one system might refer to the width of an item by "w", yet another might refer to it by "wid". Again the improper nomenclature on a system will cause the system to return an incorrect result. Not only must a user be familiar with the proper names of attribute characteristics in order to narrow his search, but he must also be aware of what the attribute characteristics are of a particular item. For instance, if one was told to find a standard hex-head bolt with a grip length of 3.18 mm, a length of 25.4 mm, and a hex size of 11.11 mm, here are some questions one might have: What is grip length? Is the grip length from the end of the bolt or the end of the threads? Is the hex size from bolt head point or the bolt head flat? These questions demonstrate how much knowledge a user must have about the item he is searching for, before he looks for it. On these traditional systems, without such knowledge a user has little chance of a successful search without outside assistance.

What if a user wanted to search by more than one attribute characteristic? Currently, to do so a user might then narrow a search by specifying that the length of the item needs to be less than 10 inches and the width greater than 16 feet. To create such a request a user needs to be familiar with how the system requires the input of such relationships and multiple criteria. To specify the above criteria the proper entry might look like this: l<10" and w>16', or this: l<10"^w>192", or this: len less 10 in and wid more 16 ft. Again without knowing the specifics of a particular system, a user will have little success searching without training and practice.

It is clear from the above examples that a user needs to be familiar with many different aspects of search terminology and of the item itself before coming up with a proper search before the user even gets to look at the results. A user needs to know what attribute characteristics describe the specific product, what the abbreviations of those attribute characteristics are, how to specify a maximum, minimum or exact boundary of that attribute, what kind of measurements are relevant to such an attribute characteristic and how to specify them (feet v. inches, meters v. inches, feet v. millimeters etc.), and an understanding of how connectors (and, or, not) work to combine multiple search criteria. After all of this, a user must then still enter the search in a way that the system expects or all is for naught. Thus the user is assumed, by these traditional systems, to have a tremendous amount of innate knowledge of a particular system when performing a traditional search on a procurement system.

It is clear from the above, that just to get results that match a specific query, a tremendous amount of effort must be made by a user to format that query properly. There always is a danger that when a result is given to a user, it might not be exactly what the user wants, not because of the data supplied, but because of the order or format it was supplied in. Thus, system searching dependence takes valuable time away from the true purpose of a procurement search system, i.e. to locate a particular item fast and efficiently without mistakes.

There has been a long standing need for a search system that would allow users to search for items in a way that doesn't require them to know specific formatting and syntax requirements for each system. There is a further need for a search system to convey to a user what the attribute characteristics of a specific item are, so that a user can narrow a search quickly without full knowledge of the desired item. There is a further need for a system to simplify how a user inputs specific attributes, i.e., specific values for the attribute characteristics, as well as reducing the amount of errors that often happens when doing so. There is a further need for a system to eliminate the uncertainty of the "formatting error" of a search so that when the system returns no matches, the user knows it is because there are no items based on those specific attributes, and not because the user improperly formatted a search. The present invention addresses all of these concerns.

SUMMARY OF THE INVENTION

In one aspect of the present invention, a method for performing parametric searching includes providing a name associated with a desired item and generating search results having attribute characteristics associated with that name. At least one specific attribute is provided for at least one attribute characteristic and search results are generated that show all items having the specific attribute or attributes.

In another aspect of the present invention, a system for parametric searching on a computer network has a client system for entering a name and a specific attribute(s) associated with an item. A server system is provided for generating attribute characteristics associated with the name and generating items having at least the same attribute(s) associated with the item.

In yet another embodiment of the present invention, apparatus for parametric searching is embodied by a computer programmed to allow input of a name associated with an item and to generate search results with attribute characteristics associated with the name. The computer is further programmed to allow input of a specific attribute for at least one of the attribute characteristics and to generate search results showing items having at least the specific attribute.

In still another embodiment of the present invention, a computer is programmed to execute a process for performing parametric searching. The process provides a server system with a name associated with an item. Search results are generated having attribute characteristics associated with the name. The server system is provided with at least one specific attribute for at least one of the attribute characteristics and search results are generated of items having at least the specific attribute or attributes.

In still another embodiment of the present invention, computer-readable media embodies a program of instructions to perform parametric searching. A server system is provided with a name of an item and search results are generated that have attribute characteristics associated with that name. The server system is further provided with at least one attribute for at least one attribute characteristic and search results generate items having the attribute or attributes.

In still yet another embodiment of the present invention, a business-method for parametric searching provides a server system with a name associated with an item. Search results have all attribute characteristics associated with the name. The server system is provided with at least one specific attribute for the attribute characteristics. Search results generate all items having at least the same specific attribute or attributes. A fee is charged.

In another embodiment of the invention, an e-commerce system has software for parametric searching. A server system is provided with a name associated with an item. Search results are generated having attribute characteristics associated with the name. The server system is provided with at least one specific attribute for at least one attribute characteristic. Search results are generated having at least the same specific attribute or attributes.

BRIEF DESCRIPTION OF THE DRAWINGS

The subject matter regarded as the invention is particularly pointed out and distinctly claimed in the concluding portion of the specification. The invention, however, both as to organization and method of operation, may best be understood by reference to the following detailed description, when read with the accompanying drawings, in which:

FIG. 1 is a simplistic diagram of a computer network system that is suitable for practicing the preferred embodiment of the present invention.

FIGS. 3A-3D illustrate individual portions of exemplary screens depicting keyword input field 62, keyword selection tree 64, and image window 82 within the keyword search module 40.

FIGS. 4A-4D illustrate individual portions of exemplary screens depicting the expanding keyword selection tree 64.

FIG. 5 illustrates an example of image window 108 overlaying a screen.

FIGS. 6A-6F illustrate whole and individual portions of exemplary screens depicting the differing attribute characteristics screens.

FIGS. 6E-6F illustrate whole and individual portions of exemplary screens depicting the internal location and quantity search.

FIGS. 7A-7H illustrate whole and individual portions of exemplary screens displaying specific attributes of each specific item as well as the sort order window 184.

FIG. 8 illustrates an example of a detail screen.

FIGS. 12A-12G illustrate whole and individual portions of images displaying exemplary screens within the manufacturer search module 42.

FIGS. 13A-13G illustrate whole and individual portions of images displaying exemplary screens within the global search module 44.

BEST MODE FOR CARRYING OUT THE INVENTION

Figure 2A:
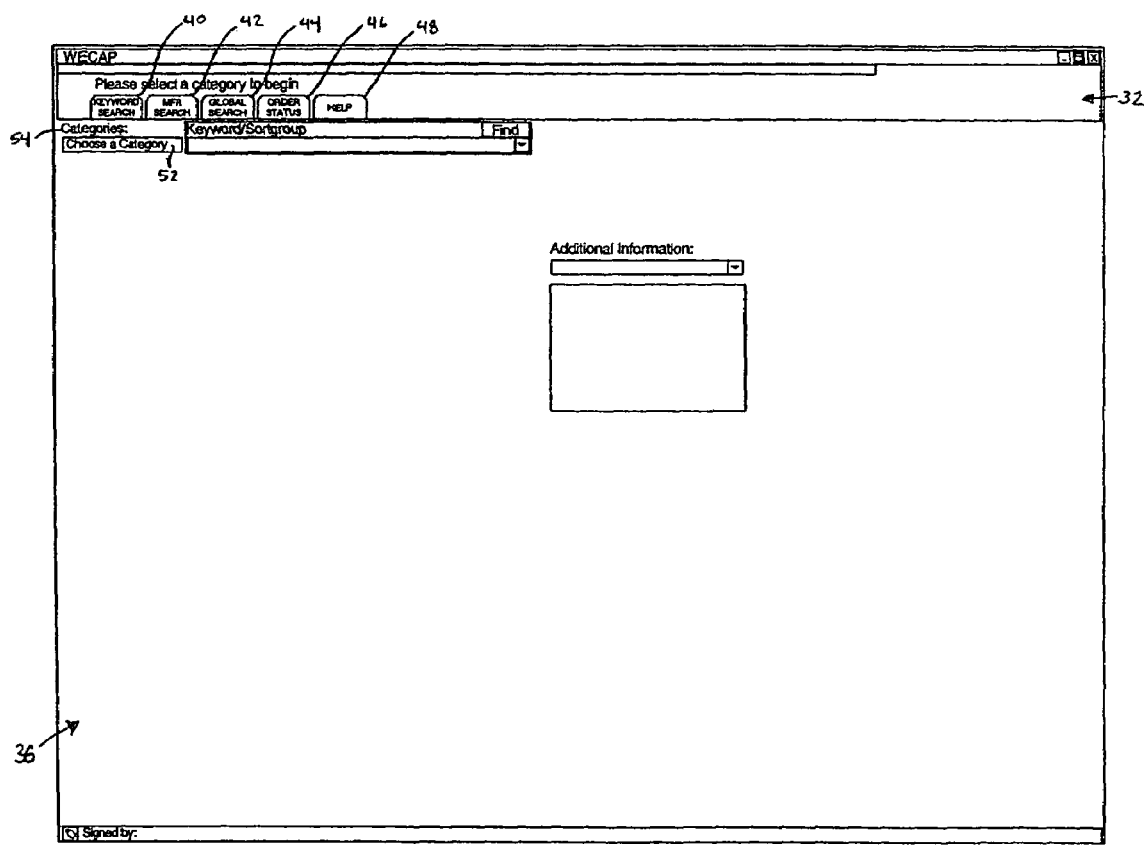
FIG. 2A illustrates an example depicting the initial screen for the keyword search module 40.

For purposes of explaining the detailed description of the invention and for purposes of making clear the intended scope of the appended claims, the following definitions of key terms are provided:

1. parametric searching: a search based upon variable quantity(ies) or quality(ies) that restricts or gives a particular form to the item it characterizes;

2. attribute characteristic: a particular quality(ies) that restricts or gives a particular form to the item it characterizes.

3. specific attribute: the value of an attribute characteristic.

4. name: one or more of the elements of a keyword having a specific set of attribute characteristics, wherein keyword represents the name or string of names for initiating a parametric search for an item.

The invention in its preferred embodiment is encompassed in a web engineering cataloging and procuring ("WECAP"™) system and method using parametric searching. WECAP™ is an electronic application and system utilizing JAVA or JAVA based technology or equivalent. WECAP™ aids users in engineering design and allows users to order items from various sources including shop floor disbursements of items in inventory. Use of WECAP™ has improved the way business users can procure items by providing one system and method where a user can (a) search, using multiple modules, for specific items both internally and externally to a user's business; (b) view detailed product characteristic information and scalable imaging; (c) find specific internal locations with known quantities of such items; (d) send order requests for the items desired; and (d) view the approval process for the items ordered, all via an electronic network. WECAP™ additionally provides an efficient and user-friendly interface for interacting with the computer and cataloging and procurement software by creating an ergonomic, aesthetic, and instinctive feel.

Parametric searching is able to remove the guesswork from searching by proactively presenting the user with possible choices, and letting the user select which choices are desired. Parametric searching also eliminates the possibility of an incorrect search based on improper terminology or names. The present invention already contains desired attribute characteristics and specific attributes about an item in its database, and allows a user to use them to search more efficiently than traditional searches. After the type of the item is properly selected through a keyword, a list of all or a pre-selected subset of all attribute characteristics about that type of item is displayed to the user. The benefit of this is that it takes the guesswork out of the user inputting what the name of an attribute might be when searching for an item. Further, with columns titled "Equal to", "Maximum", and "Minimum" and the rows being the attribute characteristics, a spreadsheet is created where the user only has to worry about inputting the specific attributes in the appropriate cells. Also, because all or multiple attribute characteristics are shown, multiple criteria can be searched without the need of knowing connectors, simply by entering specific attributes in multiple cells that correspond to the different attribute characteristics. Thus, the only reason entered criteria would lead to no results is if the specific attributes entered in the cells did not correspond to anything in inventory, not because of an improperly formatted query due to lack of system specific search terminology. Further discussion will assume that all attribute characteristics of the item are displayed for searching.

Further, now that a user has access to all of the attribute characteristics of an item, he has amazing control over the specificity of the search for an item. Whereas filling in a specific attribute for one attribute characteristic might allow for many results which satisfy the search criteria, filling in a specific attribute for multiple attribute characteristics will quickly narrow a search to just a few possible items. This allows for fast filtering of results and less time wading through results that are not desired.

Another benefit of parametric searching in this manner, is that this kind of search will always bring back a conclusive answer. When searching the traditional way, it is possible that the item being searched for exists in inventory but is unable to be found because of human error in spelling or formatting etc. A user has no choices to begin with and must find something that matches his query. If there is no match, a user can never be 100% sure that it wasn't his own improper searching that caused such a result. Parametric searching changes this by giving the user everything in the database first, and letting the user filter his choices to what he wants. Thus, if a user doesn't find a match for what he is looking for, he can be assured that the item is not available in the database and, hence, not available in inventory.

The system in accordance to the present invention is built from a combination of off-the-shelf hardware and software packages and custom software. WECAP may exist on any conventional personal computer or workstation running a suitable operating system such as Windows™, Windows NT™, or Linux, for example, as well as a suitable web browsing application, such as Microsoft Internet Explorer™ or Netscape™, for example. One aspect of the present invention includes a technique by which a user can participate in the procurement of an item via an electronic network, such as the Internet or an Intranet, a Wide Area Network (WAN) or Local Area Network (LAN). These and other aspects of the present invention will be described below in greater detail.

In one embodiment, the present invention is carried out in a computer system by a microprocessor executing files containing sequences of instructions (e.g., Java, Java Server pages, or Hypertext Markup Language or "HTML" script embedded with graphics and other scripts) contained in a memory. The execution of these instructions causes the microprocessor to perform steps of the present invention, which are described below. The instructions may be loaded into computer-readable media for execution by the microprocessor from a storage type device. Also, the instructions may be received by the computer system via a network or wireless network from another computer system. In other embodiments, hardwired circuitry may be used in place of, or in combination with, software instructions to implement the present invention.

Referring now to the drawings, and initially to FIG. 1, in one embodiment of the invention, there is a connection via Internet 20 between a client system 22 and web server system 24. Web server system 24 is a multi-user, concurrent use system and includes a web server and other programs and files that can contain references to other files in addition to a computer system in which one or more web servers and other programs run. The web server system 24 further includes a database 26, such as a relational, distributed, or object-oriented database with logic functions, processing, creating and storage, and importation and exportation of data capabilities. More specifically, the web server within the web server system 24 is a program that, using a client/server model and the World Wide Web's Hypertext Transfer Protocol or Secure Hypertext Transfer Protocol ("HTTP" or "HTTPS"), serves files containing information that form web pages to users whose client systems 22 contain HTTP clients that forward their requests. For example, a web browser application, such as Microsoft Internet Explorer®, for example, is a HTTP client that sends requests to web server systems. When a user on a client system 22 enters file requests by either "opening" a web file (typing in a Uniform Resource Locator or "URL") or selecting a hypertext link, the web browser application builds an HTTP request and sends it to the internet protocol address indicated by the URL. The web server system 24 receives such request and, after any necessary processing, the requested file is returned to the client system 22.

The client system 22 is a computer system that includes a bus, a microprocessor coupled with the bus for processing information, and a main memory, such as RAM or other dynamic storage device, coupled to the bus for storing information and instructions to be executed by the processor. The client system 22 further includes ROM or other static storage device coupled to the bus for storing static information and instructions for the processor. A storage device, such as a magnetic disk or optical disk for example, is also provided and coupled to the bus for storing information and instructions. The client system 22 also includes a communication device and various input/output devices, such as monitors, keyboards, pointing devices, or printers, both being coupled to the bus. The communication device provides the client system with a connection to the Internet 20 and may be a device suitable for such purpose, such as a telephone or cable modem, ISDN adapter, or wireless adapter for example.

Figure 14:
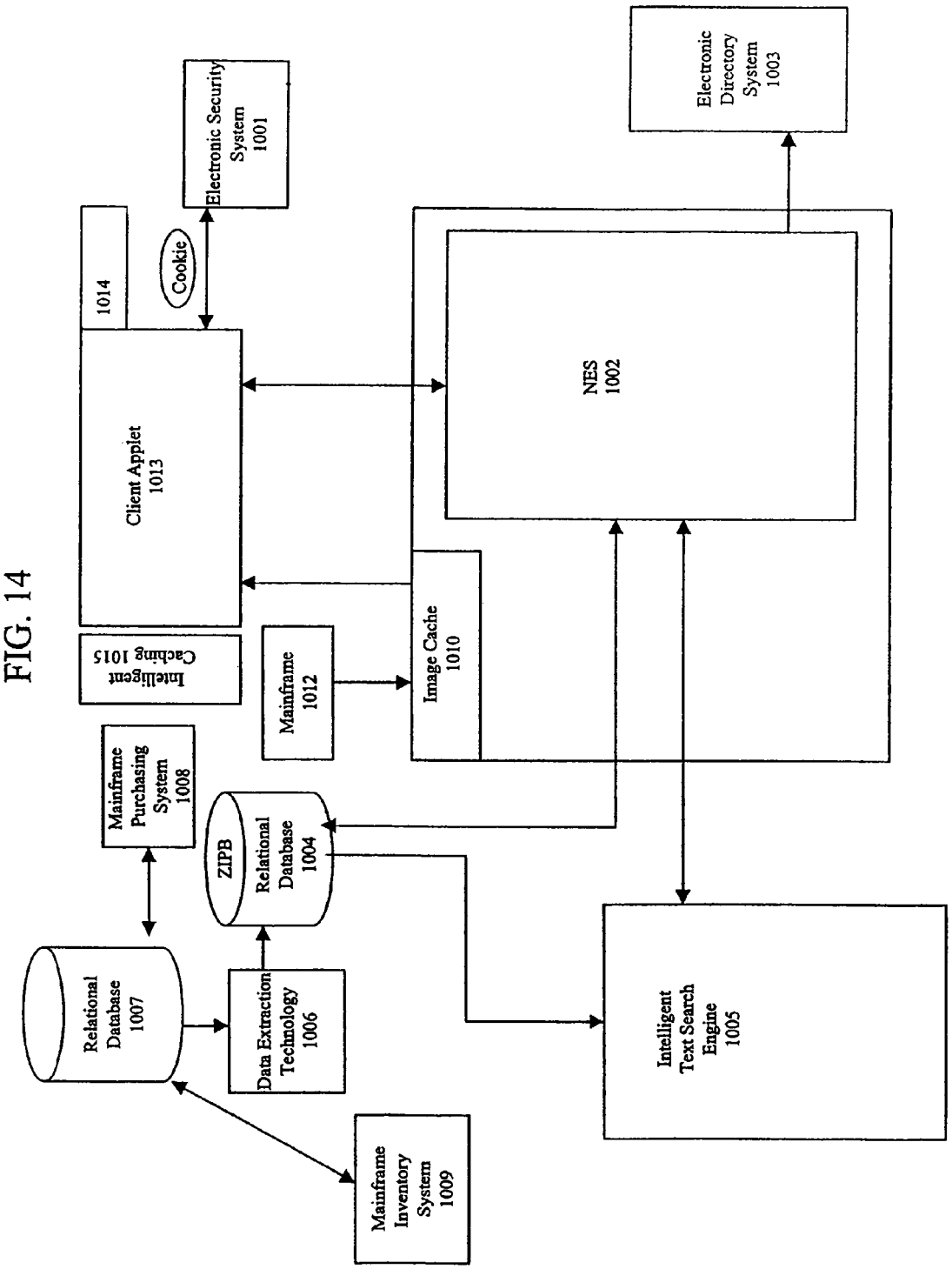
FIG. 14 illustrates a basic schematic representation of the WECAP™ architecture.

A more detailed WECAP™ architecture is shown in FIG. 14. The specific steps that a user goes through in using WECAP™ is further described in FIGS. 15A and 15B. Referring now to FIG. 14, a customer, using a client machine logs on to WECAP™ through an Electronic Security System 1001. Electronic Security System 1001 executes on a variety of platforms such as Sun Solaris, for example, and uses a logon ID and a user assigned password. Electronic Security System 1001 also sets a "cookie" for the client machine. A cookie is generally a mechanism that allows a server to store its own information about a user on the user's own computer. After the customer has successfully logged onto WECAP™ a Client Applet 1013 is downloaded to the client machine. The Client Applet 1013 is capable of performing parametric searching, interactive animations, immediate calculations, or other tasks without having to send the user request back to an Enterprise Server 1002 such as a Netscape Enterprise Server ("NES") using WECAP™. Downloaded at the same time as the Client Applet 1013, is a set of Program Components 1014 providing the ability to create GUI (Graphical User Interface) components, such as Swing 1.11 by Sun Microsystems®, for example, installed on the client machine. WECAP™ utilizes an Electronic Directory System 1003 to verify not only a valid customer or employee but also which kind of customer or employee, for example: paid subscriber, full-time, part-time, or contract. Electronic Directory System 1003 is a directory, such as an LDAP (Lightweight Directory Access Protocol) database, for example. WECAP™ can also utilize Intelligent Caching 1015 such as Marimba's® Castanet™. Intelligent Caching 1015 allows more efficient download of the Client Applet 1013 in certain situations: on laptops, when overseas, and on the HP-UX™ workstations, for example. WECAP™ runs on an Enterprise Server 1002 such as NES, that is capable of execution on several different platforms such as Sun Solaris, for example. For ordering items searched, certain data is stored for access. This includes customer data and catalogues of items that can be ordered from various sources. To retrieve customer information for procurement, such as accounting distribution, phone number, and facility code, WECAP™ links to several systems that use Relational Database 1007, such as IBM's DB2 Mainframe, for example. WECAP™ uses Data Extraction Technology 1006, such as the Oracle Transparent Gateway, to extract data from Relational Database 1007. This technology allows fast, efficient access to the Relational Database 1007 data. As a customer searches through the various catalogs stored in WECAP™, this data is extracted from Relational Database 1004 such as Oracle 8I. Within Relational Database 1004 is a table structure that further makes performing parametric searching efficient. FIGS. 16A and 16B show the general table structure within Relational Database 1004 with individual tables and their corresponding interrelationships.

When a customer finds the necessary item(s) from the displayed search results, WECAP™ retrieves an image(s) that corresponds to the item number(s) from the Image Cache 1010. All images in WECAP™ are stored on this Image Cache 1010 for fast, efficient retrieval. A scheduled batch interface keeps the images in sync with the latest version on the mainframe through electronic transfers such as FTP (File Transfer Process) with Mainframe 1012. If the customer wants to place an online order for one of the items returned on the results screen, WECAP™ will initiate a predefined stored procedure to a Mainframe Purchasing System 1008 capable of utilizing IMS, COBOL, and/or COBOL2, for example. If the results returned necessitate a shop floor disbursement (that is, a search for and disbursement of inventoried items), WECAP™ will initiate a predefined stored procedure to Mainframe Inventory System 1009 which is also capable of utilizing IMS, DB2, COBOL, and/or COBOL2, for example. In the Global Search Module described later, a customer executes a string type search for an item across one or all catalogues. In this instance, WECAP™ will utilize an Intelligent Text Search Engine 1005 such as Oracle 8I™ or IntiFind™ by Mercado®, for example. Intelligent Text Search Engine 1005 preferably performs language translations, spell check, phonology, and thesaurus alternations to find and return search results.

Figure 15A:
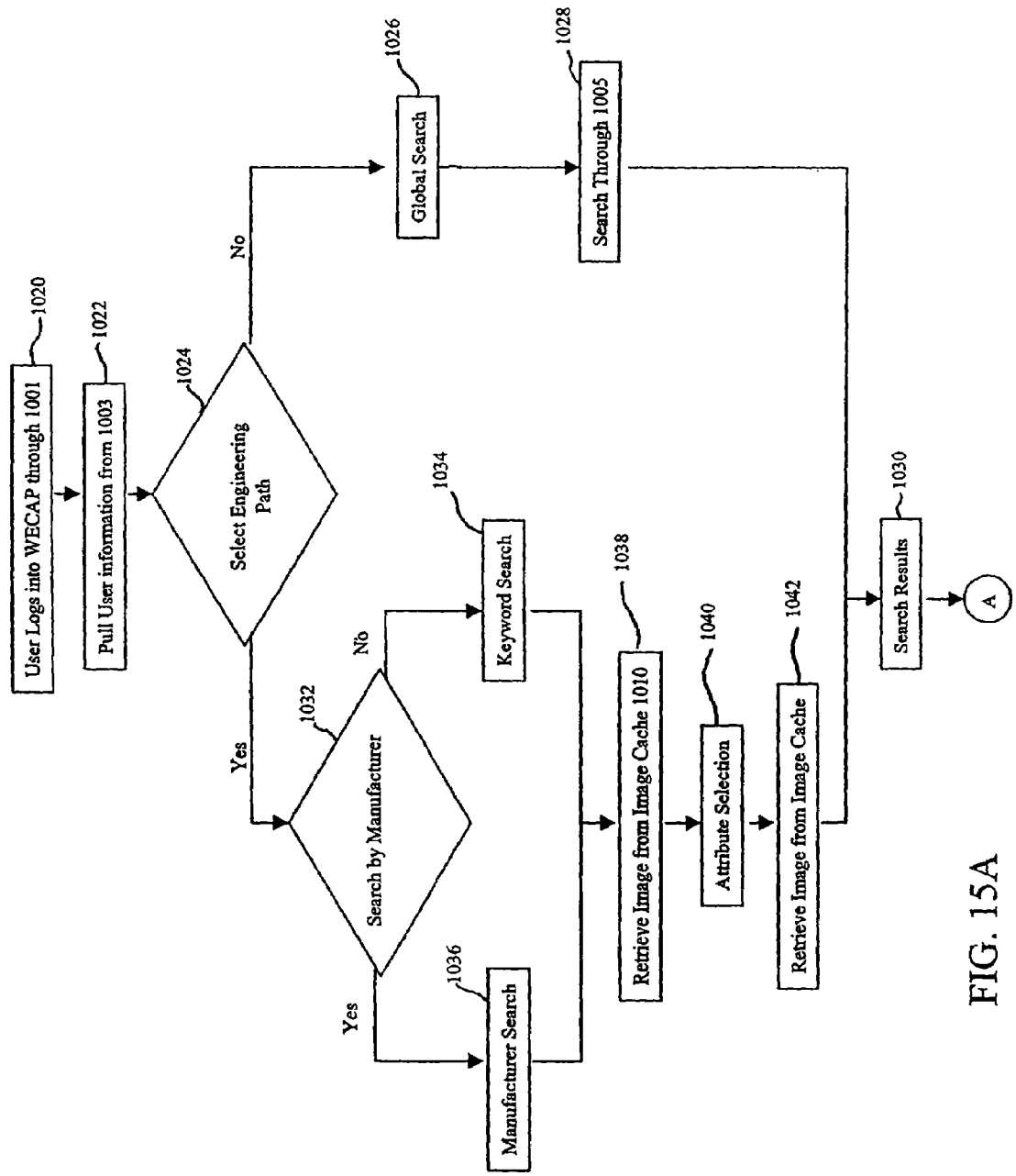
FIGS. 15A-15B illustrate a schematic flowchart representing the steps a user would following in executing the WECAP™ process.
Figure 15B:
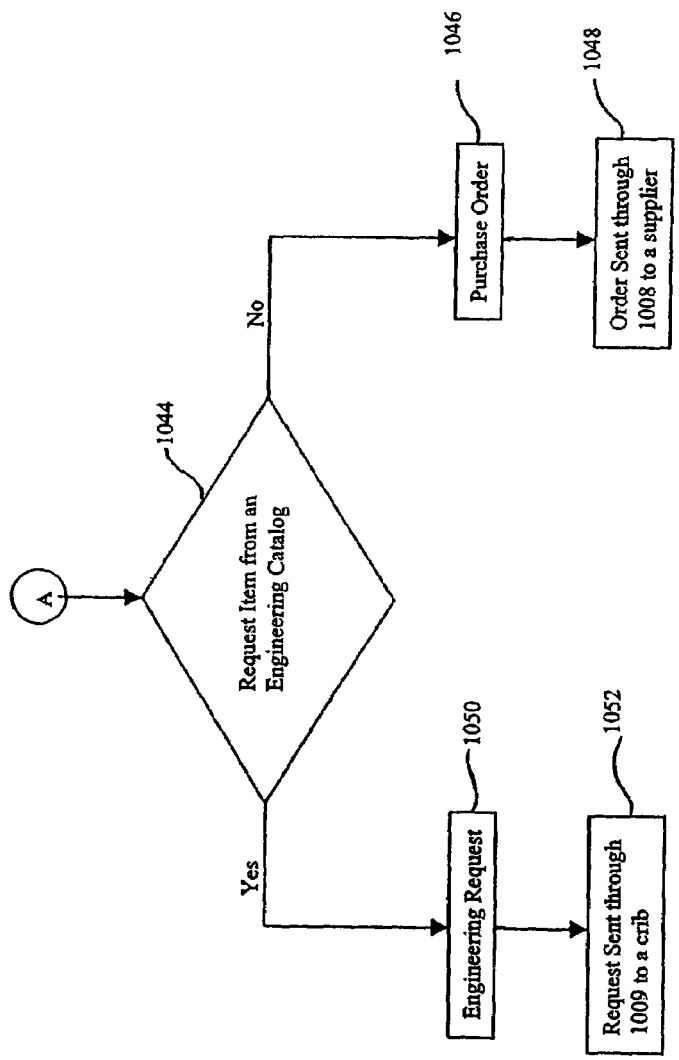
Figure 16A:
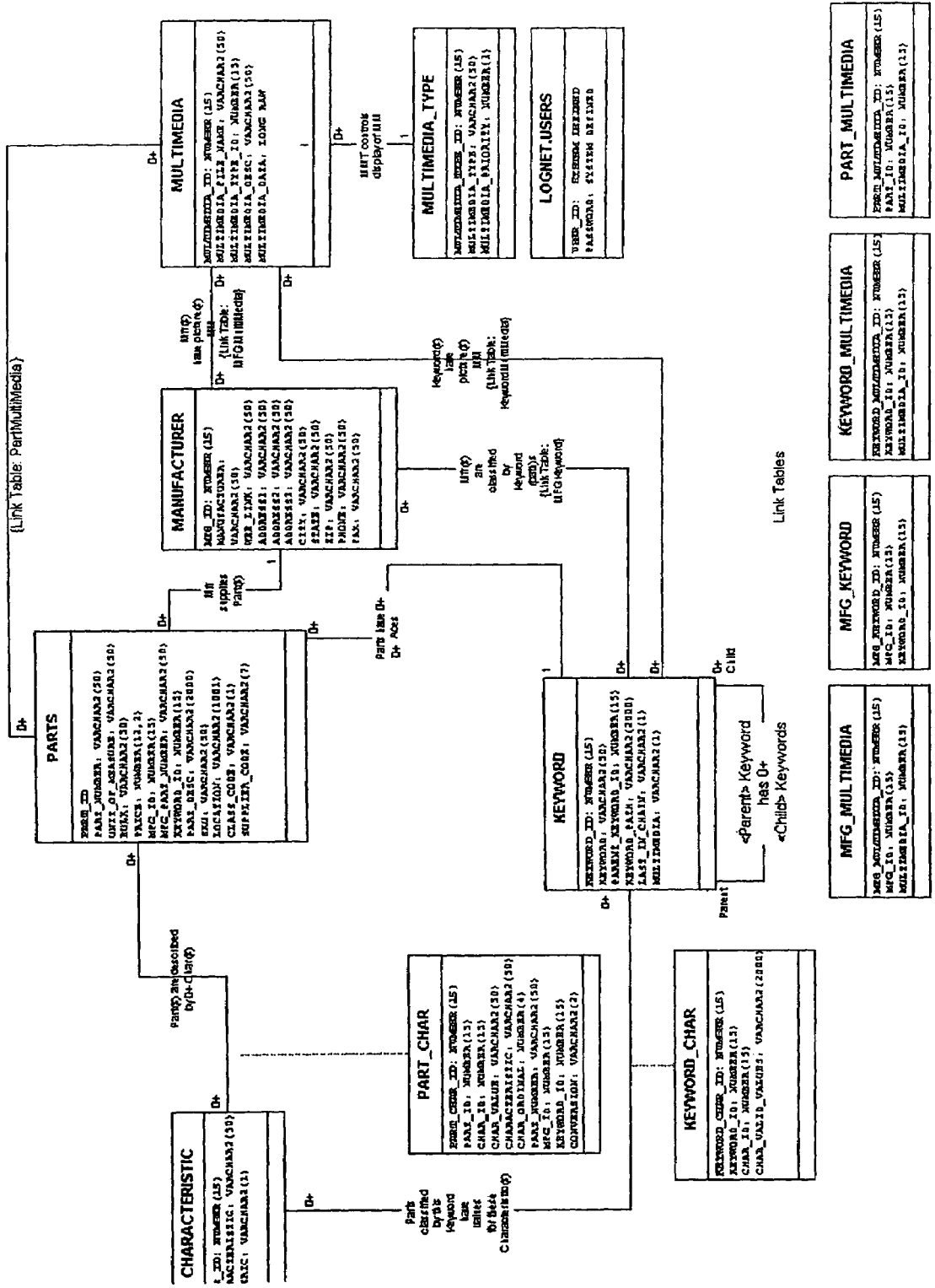
FIGS. 16A-16B illustrate the general table structure within Relation Database 1004 with individual tables and their corresponding interrelationships.
Figure 16B:
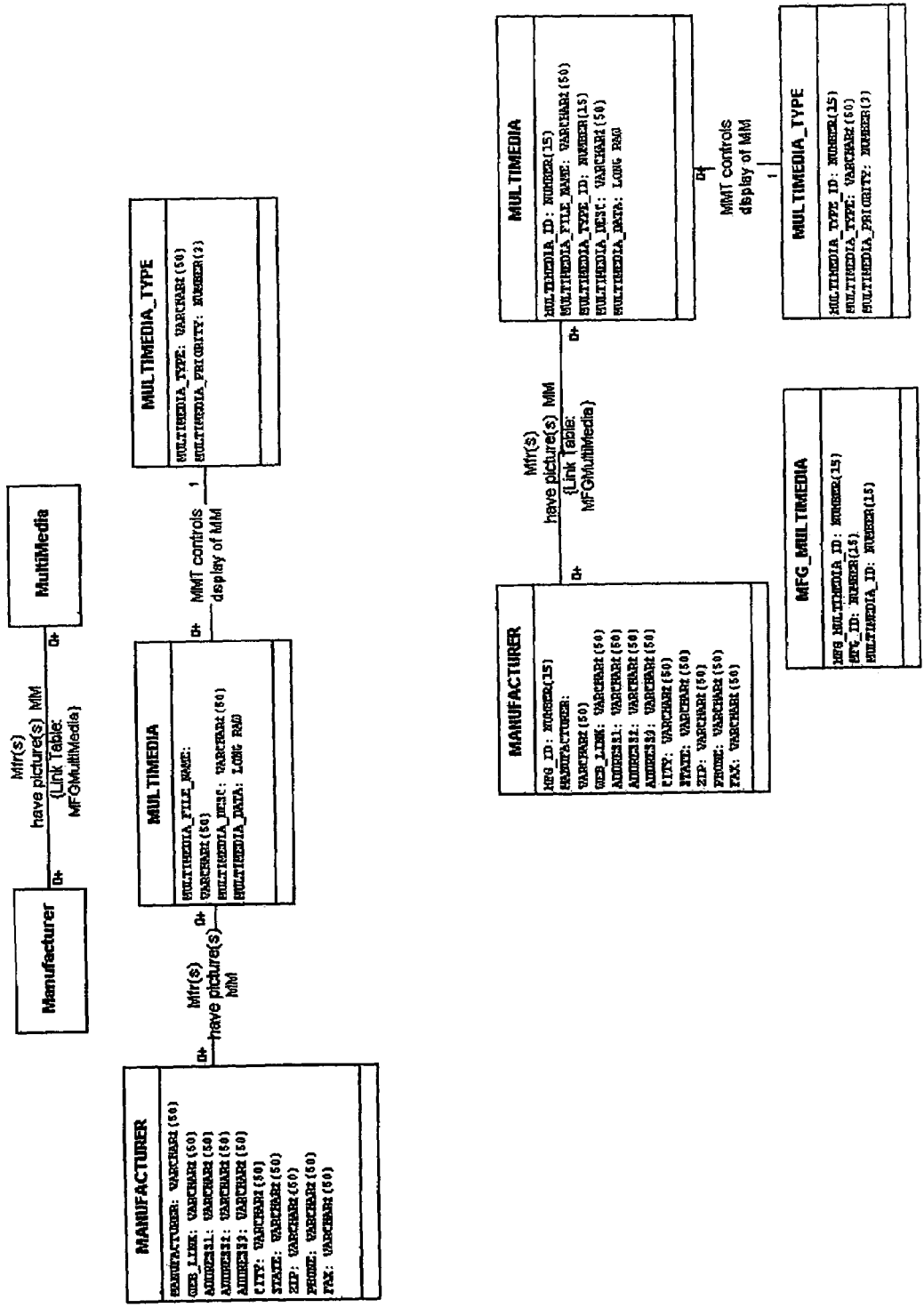

Referring now to FIGS. 15A and 15B, two schematic flowcharts representing the basic steps that a user would follow in executing the WECAP™ process are explained. Initially, as shown in FIG. 15A, a user logs into WECAP™ through the Electronic Security System 1001, as referenced by numeral 1020. WECAP™ then pulls user information from the Electronic Directory System 1003, as denoted by numeral 1022. Next, the user decides whether or not to search using an "engineering" path. (e.g., Keyword Search Module 40 or Manufacturer Search Module 42), as referenced by numeral 1024.

If the user decides not to search using an "engineering" path, the Global Search Module 44 and corresponding screen(s) will be utilized, as referenced by numeral 1026, where WECAP™ utilizes Intelligent Text Search Engine 1005, as referenced by numeral 1028, and thereafter provides the user with a results screen, as denoted by numeral 1030.

Alternatively, if the user decides to search using an engineering path, the user must decide whether or not to search by manufacturer, as referenced by numeral 1032. If the user decides not to search by manufacturer, the Keyword Search Module 40 and corresponding screen(s) will be displayed, as referenced by numeral 1034. However, if the user decides to search by manufacturer, the Manufacturer Search Module 42 and corresponding screen(s) will be utilized, as referenced by numeral 1036. Regardless of whether the user decides to search by manufacturer or not, the WECAP™ process and steps involved thereafter are similar. Specifically, as shown in FIG. 15A, the next steps after user entry or selection of data include retrieving an image(s) from Image Cache 1010, as referenced by numeral 1038; providing attribute characteristics to the user upon selection, as referenced by numeral 1040, along with providing the same image(s) from Image Cache 1010 that is provided in step 1038; and providing the search results to the user along with a specific image(s) from the Image Cache 1010, as referenced by numeral 1030.

Next, referring to FIG. 15B, WECAP™ decides whether the user has requested an item from an engineering catalog, as referenced by numeral 1044. If the user has not requested an item from an engineering catalog, a purchase order module and screen(s) (not shown) are displayed to the user, as referenced by numeral 1046, and the user's order is sent through Mainframe Purchasing System 1008 to the proper supplier, as referenced by numeral 1048. Alternatively, if the user has requested an item from an engineering catalog, an engineering request module and screen(s) (not shown) are displayed to the user, as referenced by numeral 1050, and the user's request is sent through Mainframe Inventory System 1009 to the proper crib within a particular business facility, as referenced by numeral 1052.

In order to fully appreciate the present invention, it is helpful to now refer to FIG. 2A which depicts an embodiment of an image presented as a screen display being processed according to the present invention and illustrating the initial WECAP™ interface screen or screen shot 30. After proper login by a user, screen shot 30 is the first image a user will interact with for procuring and inquiring about items. By default, screen shot 30 takes up the entire window of the browser application. Preferably, but not necessarily, screen shot 30 and all subsequent screens are constructed with two active viewports or frames, generally indicated by numerals 32 and 36. However, it is to be understood that all screens may be constructed with either a multitude of frames, one frame, or no frames at all.

Referring to frame 32 in FIG. 2A, there are five tabs across the top of the screen. These include a keyword search module 40, manufacturer search module 42, global search module 44, order status module 46, and help module 48. The order status module 16 and help module 48 are outside the scope of this invention as previously claimed and thus will not be explained. As a result, the following detailed discussion is ordered and will take place based on each individual modules 40, 42 and 44. Although all following screenshots are in the English language, there is no reason why the following could not be in any other language.

Keyword Search Module

The keyword search module 40 is shown on the opening screen by default and is as it will appear when selected to be the current top module, as shown in FIG. 2A. This default can be accepted by the user as the default search or modified to one of the other available search modules.

The keyword search module 40 generates search results to enable a user to find a desired item. To begin, a catalogue, catalogues, or category of items and articles to be searched is selected from category selection box 52 beneath the categories identifier 54, as shown in FIG. 2A. Category selection box 52 preferably contains two non-limiting types of catalogues shown in a drop box in FIG. 2B. The first type of catalogues, called internal catalogues, contain specific items and articles inventoried by a user's own business facilities. The second type of catalogues, called external catalogues, contain specific items and articles that must be special ordered from external manufacturers or suppliers and which are not inventoried by the user's own business facilities. Accordingly, the ordering process and presentation of screens to a user varies according to whether the items and articles in a selected catalogue are inventoried within the user's own business facilities or have to be special ordered from external manufacturers or suppliers.

Figure 2B:
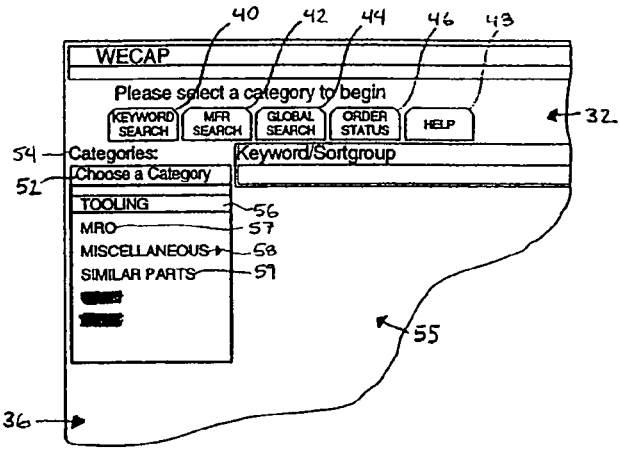
FIG. 2B illustrates an individual portion of an exemplary screen depicting the category selection box 52 and pull-down menu within the keyword search module 40.

As generally indicated by numeral 55 and individually shown in FIG. 2B, category selection box 52 will display a drop-down menu with the available catalogue categories, such as non-limiting examples TOOLING 56, MRO 57, MISCELLANEOUS 58, and SIMILAR PARTS 59. In this example, TOOLING 56 is a catalogue from the user's own business facilities and contains various specific items and articles that have been machined or tooled. MRO 57 stands for Maintenance Repair Order and is also an exemplary internal catalogue with items intended to support the users' own facilities. MISCELLANEOUS 58 is a set of catalogues from various external manufacturers and suppliers. SIMILAR PARTS 59 is a special type of internal catalogue which is an informational catalogue geared to aid engineers in the design phase in learning about and searching for particular items already approved for applications in the user's products to meet certain specific design requirements (e.g., dimensions) of a product, such as a bolt for a vehicle or machine, for example. This flexibility in the types of catalogues further makes the present invention a multi-functional, efficient, and user-friendly system.

Figure 3A:
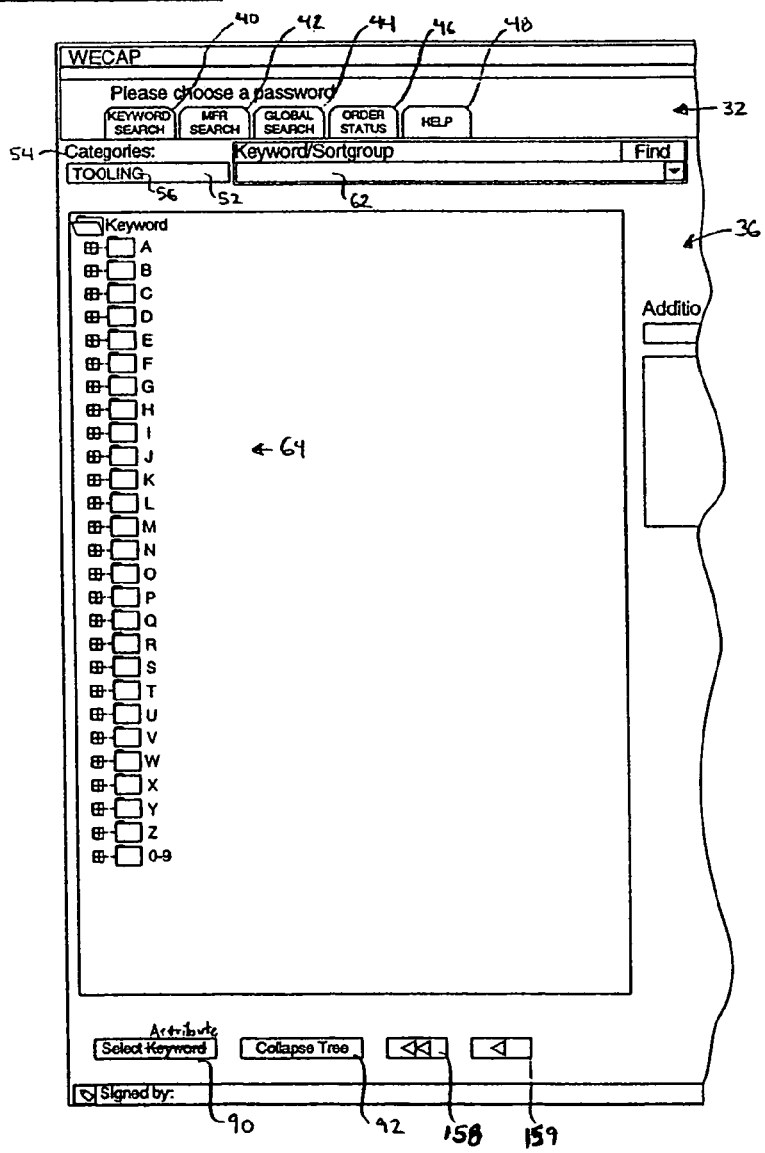
Figure 3B:
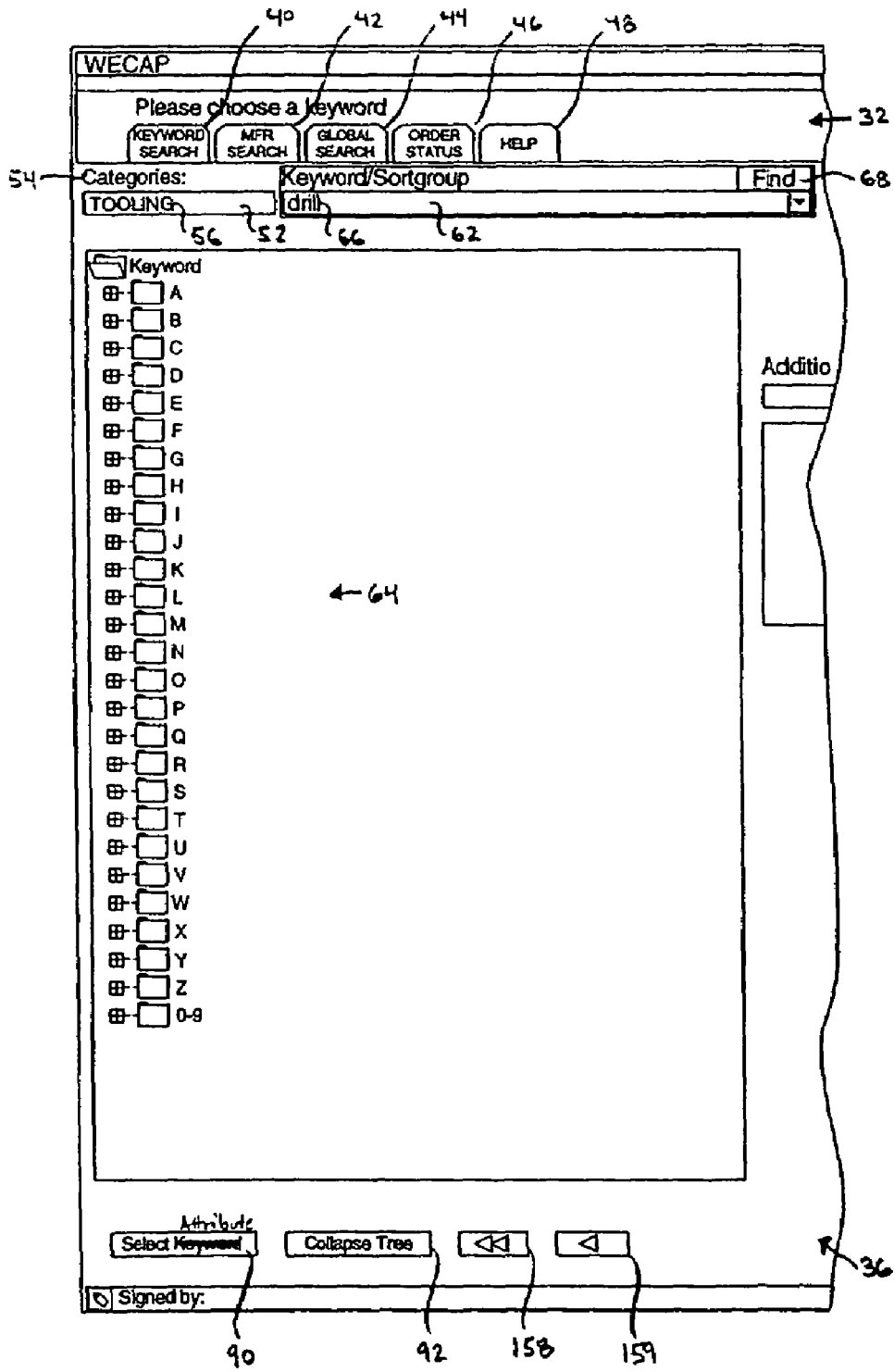
Figure 3C:
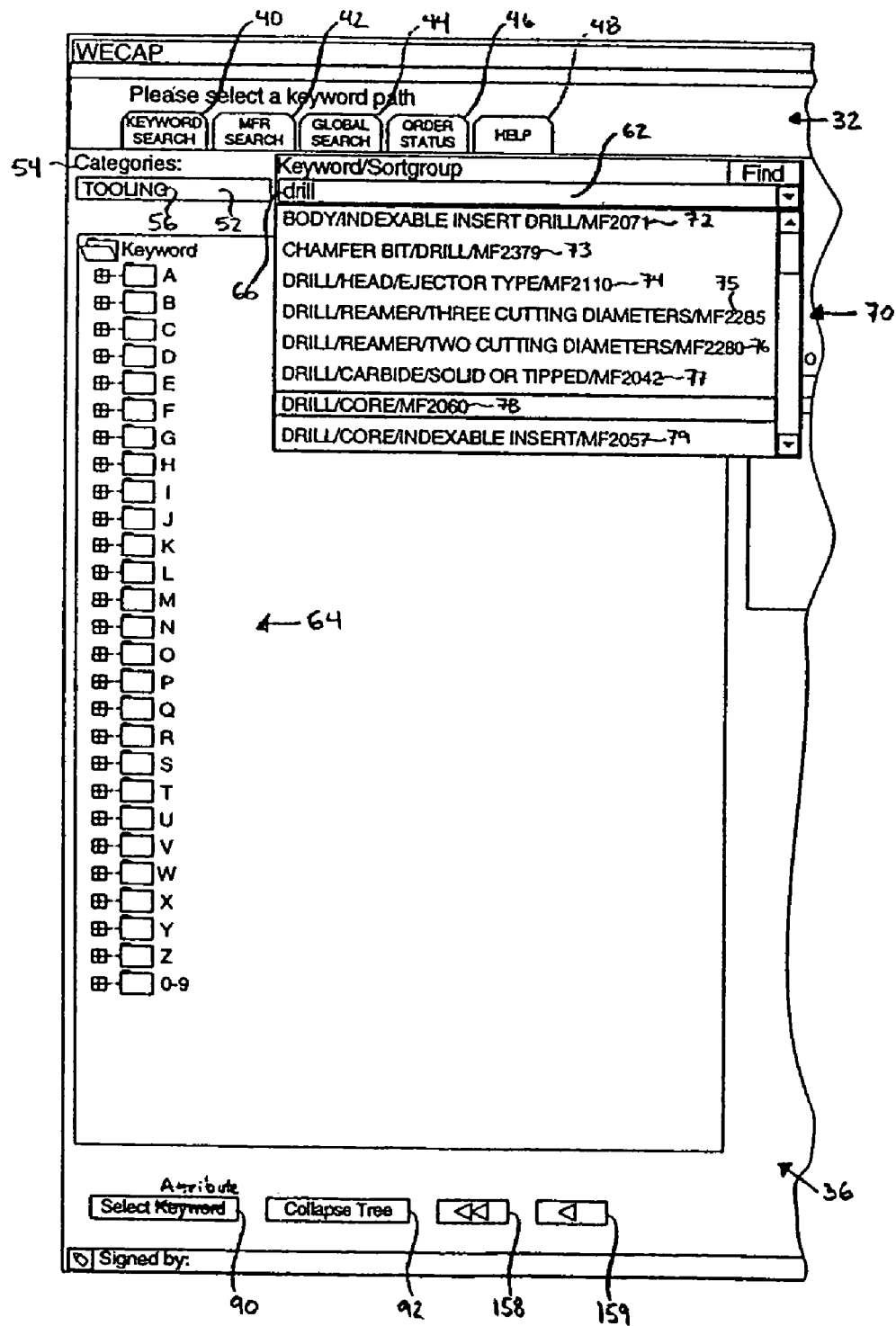

After the user has selected a particular catalogue, such as TOOLING 56, from the category selection box 52, a keyword input field 62 becomes enabled for text entry, as does a keyword selection tree 64 below that can be expanded to find a particular item for procurement, as individually illustrated in FIG. 3A by numeral 65. It is to be understood that the name can be input by means of a keyword path, i.e., a string of identifiers separate, for instance, by back slashes. Alternatively, the keyword can be input by means of a selection tree, wherein each leaf of the tree contains a successively more specific identifier term for the item. Thus, at this point, the user has the option of entering a "keyword" in the keyword input field 62 or searching the keyword selection tree 64 to "construct" the full-length name to find an item. As individually shown in FIG. 3B, if the user enters a keyword, such as "drill" 66 in keyword input field 62, and selects the enabled "Find" button 68, a scrollable, drop-down keyword menu 70 containing additional, more fully defined, keywords 72-79, which match the entered keyword "drill" 66 (i.e., have "drill" as a name within), are displayed, as individually illustrated in FIG. 3C. The next step is for the user to select one keyword in the drop-down keyword menu 70, such as the keyword 77, referred to as "DRILL/CARBIDE/SOLID OR TIPPED/MF 2042" in the keyword input field 62, for example. Thus, it is apparent that a user may search by the keyword "drill" or the keyword "DRILL/CARBIDE/SOLID OR TIPPED/MF 2042". The latter keyword will more narrowly define the search for a desired item as will become apparent below.

The selections in the drop-down keyword menu 70 are best understood by those in the industry when read from the last word to the first, i.e. DRILL/CARBIDE/SOLID OR TIPPED/MF 2042 is understood as an MF 2042 solid or tipped carbide drill. MF 2042 designates a unique configuration for items of a particular family group of items purchased or made by the user. This selection action preferably causes several things to happen simultaneously. First, as shown in FIG. 3D, drop-down keyword menu 70 closes and the keyword 77 selected is displayed in the keyword input field 62. Second, the keyword selection tree 64 automatically opens to the keyword 77 selected. Third, an image 80 illustrating descriptive information of keyword 77 (if available) appears in image window 82 to the right of the keyword selection tree 64 with a title 84 in the additional information selection field 86. Image 80 would typically be a generic blueprint, or photo (such as from a manufacturer's catalogue), or other illustration, video, or other information of the item, which would give the user a chance to get a quick look at and verify the type of item to be searched for by keyword 77. Also, a "Select Attribute" button 90 becomes enabled and provides a method of displaying all attributes relating to the keyword path selected (see FIG. 6A). Similarly, a "Collapse Tree" button 92 is also enabled for returning the keyword selection tree 64 to its original and initial format for new searches. Back buttons 158 and 159, shown to the right of the "Collapse Tree" button 92, provide a user with the capability to return to the first screen of a module as well as the immediately preceding screen, respectively.

This result can alternatively be obtained by initially searching the keyword selection tree 64, rather than the keyword input field 62, to find an item. As individually shown in FIGS. 4A-4D, a user can "drill-down" or select folder within folder until arrival upon the desired keyword 77, in this instance referred to as "DRILL/CARBIDE/ SOLID OR TIPPED/MF 2042," for example. Again this selection process is best understood by those in the industry when read from the last word to the first, i.e. DRILL/ CARBIDE/SOLID OR TIPPED/MF 2042 is understood as an MF 2042 solid or tipped carbide drill. More specifically, in FIG. 4A, upon selection of the letter "D" folder 94, an expanded view of the selection tree list of folders 96 is displayed beginning with the letter "D". In FIG. 4B, the user specifically selects the "DRILL" folder 98 which further expands the selection tree and displays a list of "drill" folders 100. Next, after selection of the "CARBIDE" folder 102, as shown in FIG. 4C, the "SOLID OR TIPPED" folder 104 appears and when selected displays its contents which include keyword 77. When the keyword 77 is finally selected, as shown in FIG. 4D, it will also appear in the keyword input field 62, as individually shown in FIG. 4D, and will be the identical screen shot that resulted from the keyword input field 62 procedure described above and shown in FIG. 3D.

Referring back to FIG. 3D, the image window 82 to the right of the keyword selection tree 64 can be made larger by selecting image 80. Upon selection, image 80 is scaled up to the enlarged image 106 and window 108, as illustrated in FIG. 5, appears and, in this instance, overlays part of the existing screen. Window 108 allows for advanced scalable manipulation of image 80 through buttons 110-116 where buttons 110 and 111 allow for zooming in and out, buttons 112 and 113 allow for rotating left and right, button 114 allows for inverting, button 115 allows for fitting the image to screen, and button 116 allows for specific rectangular zooming in. Window 108 can also be enlarged for full screen viewing by selecting the maximize button 116 located between the minimize button 117 and exit button 118 in the upper right hand corner of window 108. When through viewing image 106, selection of the exit button 118 causes the image to be minimized to the original image window 82, as shown back in FIG. 3D. Image 106 preferably will contain an image of keyword 77 relating to the catalogue that one is currently in. Every attribute characteristic that keyword 77 is searchable by will preferably be indicated on image 106 for any user to see. Further, image 106 will preferably show exactly what each attribute characteristics means in relation to keyword 77. Not only will this eliminate confusion about what exactly each attribute characteristics means, but it also allows for different images to be created using company specific attribute characteristic names. This will allow a user who is not familiar with that company's specific attribute characteristics terminology to still be able to search with the users' expected attribute characteristic in mind, because it is clear from the image 106 what the term is for that attribute characteristics' name is.

Having verified through the image that the correct item is being sought, the user can choose the "Select Attribute" button 90 to view a new screen in frame 36 shown within FIG. 6A, to identify attribute characteristics for the keyword 77. This will permit entry of the specific attributes, i.e., specific values for each attribute characteristic. Each name in keyword 77 has associated with it a specific set of attribute characteristics. Thus, as a user refines a search by adding names comprising a keyword, additional attribute characteristics are added. For example, in FIG. 6A, the attribute characteristics associated with "drill" are the top 7 from SHAPE through POINT STYLE. Attribute characteristics associated with "CARBIDE" are the next 6 attribute characteristics. The greater number of names in a keyword, coupled with the attribute characteristics associated with those names (to the extent a specific attribute is entered therefor as explained below) the more narrowly defined the search will be.

Figure 6B:
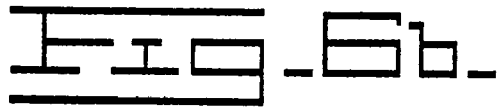
Figure 6C:
Figure 6D:
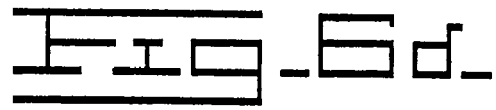

It is to be understood that upon display of the screen as shown in FIG. 6A, the keyword selected or inputted has been researched and the appropriate attribute characteristics 120 found and displayed for the chosen keyword 77. This is the genius of parametric searching. The system in the preferred embodiment is already preprogrammed with every attribute characteristic about keyword 77 in its database and in this step presents the user with all of these possibilities. See FIG. 6A. The user-need know nothing about what the attribute characteristics of a desired item are or what they are called. The database provides the user with all of the attribute characteristics. All the user needs to know (possibly after looking at image 106) is what the value(s) of the desired attribute characteristic(s) need be, i.e., what the specific attribute(s) of the attribute characteristic(s) need be. The user preferably has the freedom to specify as many or as few specific attributes as suits the user's needs. The more specific attributes selected the fewer specific items that will match. Alternatively, the fewer specific attributes selected the more specific items that will match. FIG. 6A shows that each attribute characteristic has three columns following it. These columns are entitled "Equal to" 122, "Minimum" 124, and "Maximum" 126. Additional columns may be included, such as "Greater than" or "Lesser than", for example. As individually shown in FIG. 6B, upon selection of cell 128 or downward pointing arrow 130 in the "Equal to" 122 column, a pull-down selection menu 132 with the appropriate specific attributes will appear, as illustrated in FIG. 6C. In certain instances, however, it is helpful for a user to also specify, with pull-down selection menu 132, specific attributes that are above a certain value, below a certain value, or between certain values. To accommodate this need, the next two columns, "Minimum" 124 and "Maximum" 126, allow selection and entry of specific attributes 133 and 134, for example, as shown in FIG. 6D. Thus since the system is aware of all of the attribute characteristics and specific attributes of all items, the user can, but doesn't even have to, put in a specific attribute. Simply by using pull-down selection menu 132, a user can see if a specific attribute in the database even exists for each desired attribute characteristic. If pull-down selection menu 132 doesn't have that specific attribute, the user need not look further for that item for it doesn't exist in the database. Thus the only error a user can make is if he is looking for the wrong item.

In another embodiment, the selection of a specific attribute in any pull-down selection menu 132 may dynamically eliminate other specific attributes in the other attribute characteristic pull-down menus 132. Specifically, the system will eliminate any items that don't have the required specific attributes as selected in the first pull-down menu 132. Thus the system is able to eliminate possible selections of items that don't exist in the database before an actual query is made.

Toward the bottom of frame 36, as illustrated in FIG. 6E, there is an input selection box 136 and downward pointing arrow 138 with another pull-down selection list 140, as shown in FIG. 6F, under the "Facility" heading 142. This feature provides the capability of optionally specifying which facility a user desires to search for a specific item. This is especially helpful for tracking down a specific item at a specific location, if say, the user was presented with multiple inventory locations and/or manufacturing facilities.

Furthermore, although not selected in this illustration, if a specific facility is chosen the user may further confine the search to a location within the specific facility chosen using input selection box 144 and downward pointing arrow 146 under the "Crib" heading 148. Also, if clearing of any cell is desired for any reason, "Clear All" button 150 or "Clear Row" button 152 may be selected and are self-explanatory. As explained before, the previous page buttons 158 and 159 provide the user with the ability to return to the first screen of a module as well as the immediately preceding screen, respectively. When a user has correctly specified all the specific attributes desired, the "Search" button 154, as shown in FIGS. 6A, 6E may be selected to start the search of files to find all occurrences of the specific item desired. Upon completion of the search, a screen shot such as that shown in FIG. 7A is displayed.

In FIG. 7A, the first column will preferably be the part number column 160 of a specific item. The other columns 161-167 contain complete and up-to-date specific attributes for a specific item and will vary according to the specific item selected. Also, at the very top of the screen, above modules 40-48, there is a summary of search results 168 for identification of the number of results on the current screen ("100") and the number of total results ("398"). There are also several new boxes at the bottom of frame 36 which include item box 170, view results box 172, ladder sort order 174, and units box 176. Back buttons 158 and 159 again provide the capability for a user to return either to the very first screen in the keyword search module 40 or to an immediately preceding screen in the keyword search module 40, respectively. The back button 159 is also useful if a search on specific attributes is unsuccessful and a user wants to search more or different specific attributes. A user can click on back on back button 159 and populate additional attributes in the previous screen and search again.

The view results box 172 controls which screen of specific items a user can view where there are more than a predetermined number of specific items; in this instance shown in FIG. 7A, 100 specific items. For example, if a user is viewing a first screen of specific items, the "Next 100" button 178 is enabled yet the "Previous 100" button 180 is not enabled. If a user is viewing a second or higher screen, however, both "Next 100" button 178 and "Previous 100" button 180 are enabled (not shown). Finally, if a user is viewing the second to last screen of specific items, the "Previous 100" button 180 is still enabled while the other "Next 100" button 178 will automatically change to read "Last XX", where "XX" is the number of specific items to be displayed on the last page (not shown).

The ladder sort order box 174 provides the user with the flexibility to sort the resultant data of specific items into an order that is more useful to that particular user. For example, in order to change the order of the specific items displayed, the user may select the "Modify" button 182. Upon selection, as shown in FIG. 7B, a window 184 is automatically displayed overlaying the center portion of the screen. Within window 184 are two boxes. The "Current sort order" box 186 is shown on the left-hand side with the current sorting scheme displayed. An empty "New sort order" box 188 is on the opposite side for placement of attribute characteristics in a desired sort order. As illustrated in FIG. 7C, upon selection of attribute characteristic 190 within for primary sorting, two arrows 192 and 193 will appear in between "Current sort order" box 186 and "New sort order" box 188. By selecting the right facing arrow 192, attribute characteristic 190 can be moved to the "New sort order" box 188 and becomes a primary sort parameter. Additional attribute characteristics can likewise be moved to the "New sort order box" 188 for further specificity. Similarly, by selecting an attribute characteristic in the "New sort order" box 188 and selecting the left facing arrow 193, such attribute characteristic can be returned to the "Current sort order" box 186. Alternatively, if sorting by part number is desired, "Sort by Part Number" 194 may be selected. After making the appropriate attribute characteristic sort order selection(s), the user may select the "Cancel" button 195 for canceling the request, or the "OK" button 196 to view the sort order specified with the specific sort parameters, such as attribute characteristic 190, being displayed in the first column, as shown in FIG. 7E. If the new sort order is found unacceptable, a user can easily reset the original sort order parameters by selection of the "Reset" button 197. An additional feature that may be added is storing the new sort order in a user profile such that upon the next viewing of this keyword display, the attributes will be displayed in the modified new sort order.

The units box 176 determines the units of measurement that are used to display the data in the specific attributes columns and includes a "Default" radio button 198, "Metric" radio button 200, and "English" radio button 202, as individually illustrated in FIG. 7F. The "Default" radio button 198, upon selection, displays data in the format in which it was stored. For example, English (decimal) numbers are displayed with the period as the separator between the whole numbers and the fractional amount whereas metric numbers are displayed using the semicolon as the separator. Preferably all English numbers are displayed in one kind of unit, e.g. in inches, and all Metric numbers are also displayed in one kind of unit, e.g., in millimeters. An example of data shown with the "Default" radio button 198 selected is seen in FIG. 7F. The first seventeen specific items 204 have specific attributes that are shown in English format and the remaining specific items 206 are shown in metric format. Selecting the "Metric" radio button 200 will convert all English format values to Metric, as individually shown in FIG. 7G. Similarly, selecting the "English" radio button 202 will convert all values to English, as individually shown in FIG. 7H.

The final box to be described on this screen is the item box 170, as illustrated in FIG. 7H. The item box 170 is utilized after a user has scrolled through and/or rearranged the attribute characteristics to find the specific items desired. Once highlighted, the specific details of the specific item can be displayed by selecting the "Details" button 208. The "Attributes" button 212 to the right of the "Details" button 208 becomes enabled upon utilization of the global search module 44 and will be explained in more detail below with such module.

Upon selection of the "Details" button 208, as seen in FIG. 7H, a new screen appears in frame 36, as illustrated in FIG. 8. This screen provides all the available specifications for the specific item selected, including a detailed specific image 214 of the specific item within image window 215. The detailed image 214 in image window 215 can be enlarged and manipulated as described previously with image 80 in image window 82 in FIG. 3D. Referring back to FIG. 8, the self-explanatory fields "Item #" 216, "Price" 218, "MFR Name" 220, "MFR Part #" 222, and "Web Link" 224 are static information fields for the unique specific article and will vary accordingly. The description box 226 is a text-based description of the specific item selected. It can contain the specific attributes and other descriptive data. In addition, the scroll bar 228 can access the same detailed information for the next specific item matching the search criteria by selecting the right arrow 229 or the left arrow 230 to view previous detailed information on a specific item. Back buttons 158 and 159 again provide the same functionality as stated previously.

Further, when the specific item selected is an article made or stored within the user's own relevant facilities (e.g., part of an internal catalogue), locations box 232 appears and is displayed. The locations box 232 displays the locations within the user's facilities that have the specific item. Selecting a specific location 234 within the locations box 232 will cause a search of database 26 to determine the quantity on-hand for that location 234 selected. The fields "Bin" 236, "Quantity" 238, and "Building Code" 240 are further details regarding the very specific location within location 234 of the specific item and are similarly updated upon selection of location 234.

Manufacturer Search Module

The manufacturer search module 42 generates search results for a desired item and will now be discussed. The manufacturer search module 42 is similar to the keyword search module 40 described earlier. The initial screen, as illustrated in FIG. 12A, looks identical to that of the keyword search module 40 in FIG. 2A except that the manufacturer search module 42 has been selected and is now the current top module.

To begin, as previously explained, a catalogue of items and articles to be searched is selected from category selection box 52. The category selection box 52 within the manufacturer search module 42 contains the same selectable catalogues 56-59, as shown in FIG. 2B. For comparison and explanatory purposes, the manufacturer search module 42 will similarly use the catalogue TOOLING 56 in the category selection box 52. Although the categories or catalogues are the same, after the TOOLING 56 catalogue is selected, a manufacturer input field 368, rather than a keyword input field 62, becomes enabled for entry of a manufacturer making the item desired. It is to be understood, however, that the manufacturer input field 368 also permits entry of an element(s) 370 of manufacturer's name for efficiency and user-friendliness. For example, as shown in FIG. 12B, entering element(s) 370 and selecting "Find" button 372 produces selectable pull-down menu 374 of all manufacturers making item 370. Alternatively, as shown in FIG. 12C, entering the actual manufacturer 376 and selecting "Find" button 372 immediately expands the manufacturer selection tree 378 to the particular manufacturer folder 380 as well as the keyword folders within its portfolio. Continuing to expand the manufacturer selection tree 378 by selecting "DRILL" 382, as shown in FIG. 12D, then "CARBIDE" 384, as shown in FIG. 12E, then "MF2042" 386 within "SOLID OR TIPPED" 388, as shown in FIG. 12F, the user will ultimately find the item desired. Again this selection process is best understood by those in the industry when read from the last word to the first i.e. DRILL/CARBIDE/SOLID OR TIPPED/MF 2042. Once highlighted, as previously explained, an image 80 representative of the item appears in image window 82 with a title 84 in the additional information selection field 86. As also explained previously, the image 80 can be manipulated as explained above and shown in FIG. 5.

From this point on in the manufacturer search module 42, the results obtained by selecting "Select Attribute" button 90, "Search" button 154, and the "Details" button 208 will give similar results to those described previously in section KEYWORD SEARCH MODULE above. For example, the screen shot shown in FIG. 6A, after selection of the "Select Attribute" button 90, will be identical to what would appear by selecting the "Select Attribute" button 90 as shown in FIG. 12F. However, as shown in FIG. 12G, the screen shot obtained by selecting the "Search" button 154 will differ significantly in the number of specific items found. For example, the summary of search results 168 in FIG. 7A contained three-hundred and ninety eight specific articles, whereas the manufacturer search module 42 conveniently provides only twenty-four, as illustrated in FIG. 12G. One advantage, therefore, to using the manufacturer search module 42 is being able to go directly to a specific manufacturer and search through products available from that source.

Global Search Module

Figure 13A:
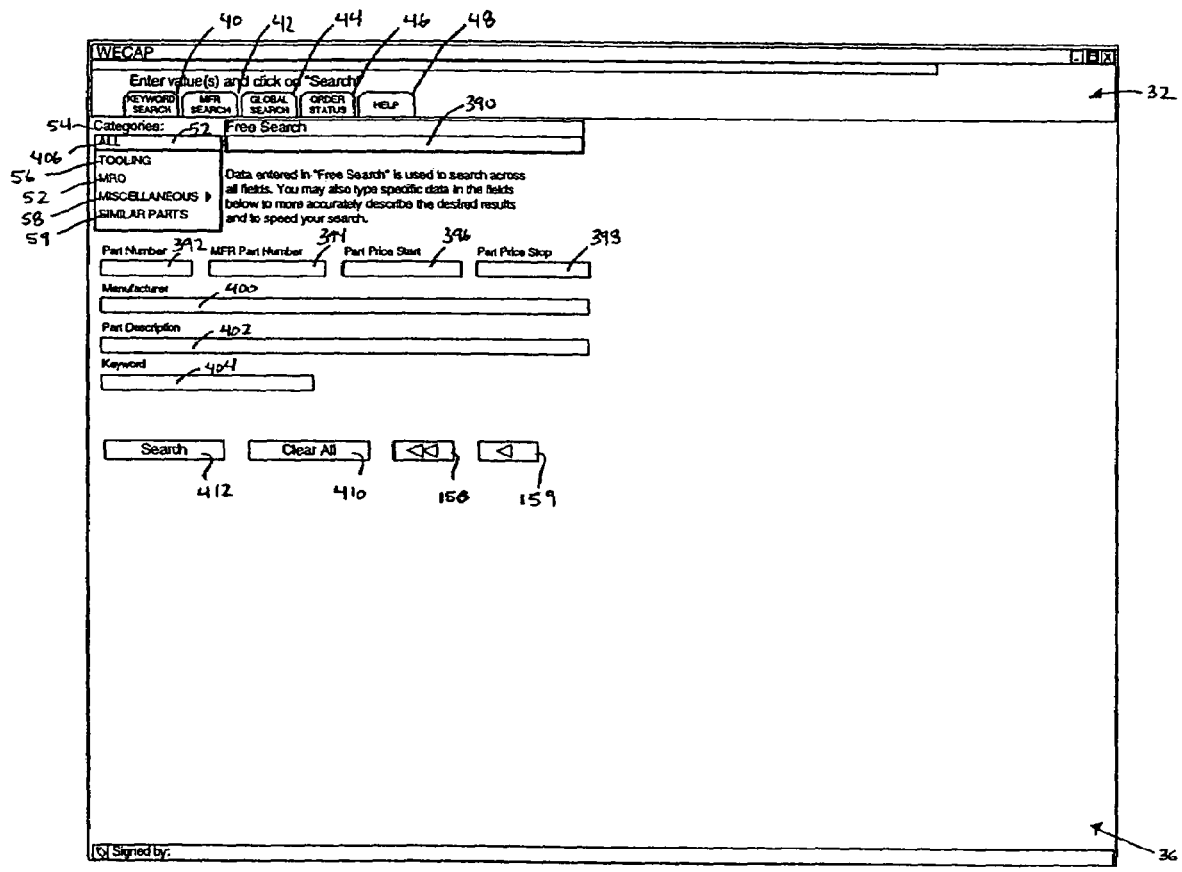

The global search module 44 generates search results for a desired item and will now be discussed. The global search module 44, as shown in FIG. 13A, is now the current top module. The initial screen, as illustrated in FIG. 13A, looks somewhat different than the keyword search module 40 and the manufacturer search module 42 for those occasions where a user knows some specific data with which to search or when a user desires to search more than one category or catalogue at a time. As explained previously, a user must first select the desired category(ies) or catalogue(s) from category selection box 52. In the Free Search field 390 in FIG. 13A, a user may enter a keyword, description, attribute characteristic, specific attribute, or price, for example.

In a first example, upon selection of TOOLING 56 within the category selection box 52, a user may attempt to duplicate the search completed above in the keyword search module 40 by entering the keyword "drill" 408 in the Free Search field 390, as individually shown in FIG. 13B. If a user selects the "Search" button 412, the next screen to appear in frame 36 is shown in FIG. 13C. It is important to note that under both the keyword search module 40 and the manufacturer search module 42 the next screen to appear would be the screen obtained after selecting the "Select Attribute" button 90 and is shown in FIG. 6A, for example. The global search module 44 renders unnecessary the functionality of the "Select Attribute" because the global search module 44 searches against descriptions rather than attributes. The global search module 44 is also suited to narrowing the number of specific items returned. Thus, the global search module 44 searches within a catalogue or across several catalogues for a specific item(s) through specification of additional information, such as those in fields 392-404 in FIG. 13B. More specifically, the more fields 392-404 that are filled, the more efficient the search and the fewer specific items that the user will have to look through. Namely, in a second example if the user again selects catalogue TOOLING 56 but additionally enters data in the Part Number field 392, as individually shown in FIG. 13D, the search will be narrowed and provide only the specific item desired in the very first row 414, as shown individually in FIG. 13E.

It is important to discuss some additional differences of the global search module 44 as shown in FIG. 13E. One significant difference from the previous two search modules 40 and 42, which have the specific attributes listed with each attribute characteristic being a column heading, as explained previously, is that the second column 161 ranks the results of the search by how many of the search criteria have been matched. Although many variations could be used to indicate the level of matching, such as direct percentages, in this example five asterisks 416 indicate that all of the criteria of the item shown match this specific search. A lower number of asterisks would indicate that a lower amount of criteria matched this specific search. An additional difference is that the third column 162 indicates which category(ies) or catalogue(s) contains the specific item. Likewise, the fourth column 163 will contain the keyword that would have been the resultant specific item in a search using the keyword search module 40, as shown in FIG. 4D, for example. Similarly, the fifth column 164 will contain a worded description including attribute characteristics and specific attributes that are on file for this particular specific item.

Figure 13F:
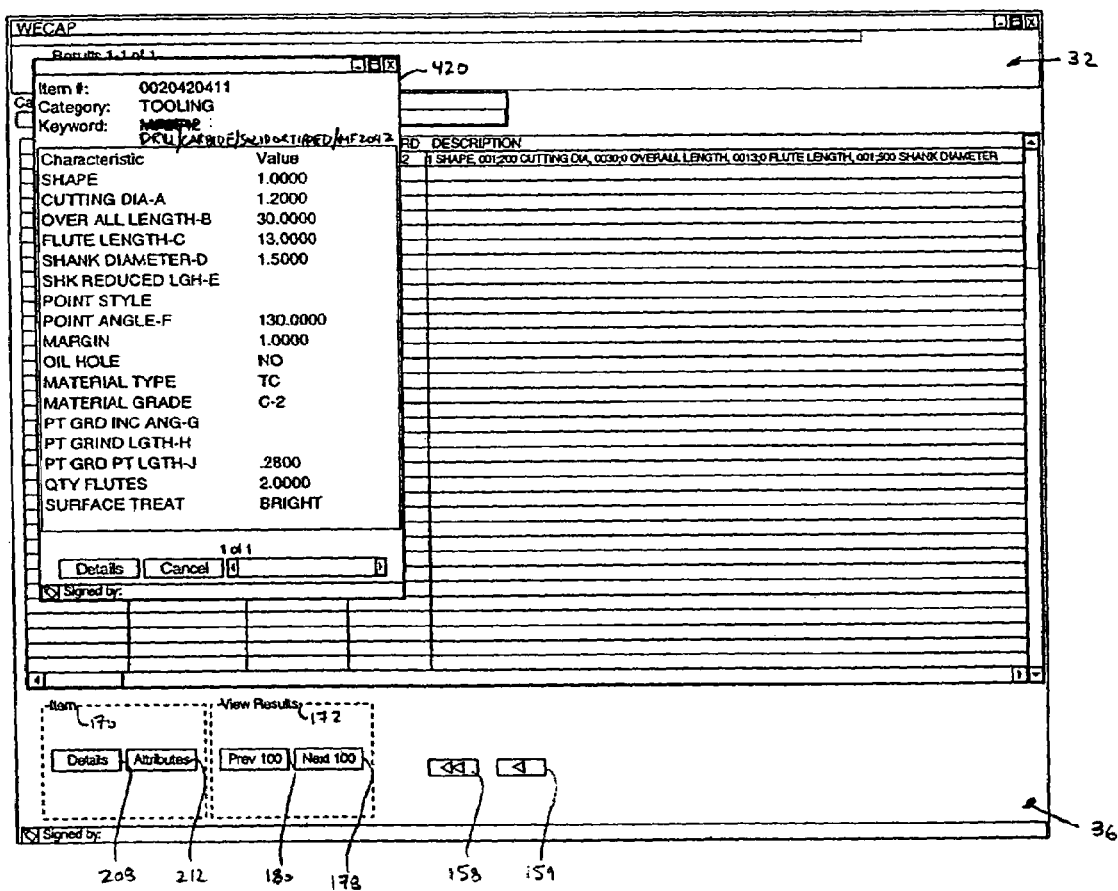

Since there are no additional columns containing the specific attributes of the specific item selected, as there were in the keyword search module 40 and manufacturer search module 42, if a user desires to see such specific attributes of certain specific items, the user may select the "Attributes" button 212 within the Item box 170, as shown in FIG. 13E. If selected, the enabled "Attributes" button 212 will bring up window 420, as generally shown in FIG. 13F, which overlays a portion of the existing screen, displaying the specific attributes for a specific item of the item highlighted in FIG. 13E. This new window 420, as individually shown in FIG. 13G, begins with the Item Number field 422, Category field 424, and Keyword field 426. Window 420 additionally displays the attribute characteristics in the first column 428 and the specific attributes of that specific item in the second column 430. This information is the same information displayed in table form in FIGS. 7A and 12G, for example. At the bottom of window 420, as shown in FIG. 13G, is the "Cancel" button 432, which will close window 420 and return the user to the previous screen as well as the "Details" button 434, which has the same effect as the "Details" button 208 in FIGS. 7E, 12G, and 13E and will bring up a screen similar to that explained previously and shown in FIG. 8.

As previously mentioned, after finding the appropriate specific article and selecting the "Details" button 434, the next screens displayed under the global search module 44 are identical to those described in the KEYWORD SEARCH MODULE section.

INDUSTRIAL APPLICABILITY

The described method and system for parametric searching, particularly as utilized in WECAP™, provides a highly effective manner of searching large amounts of data as exhibited by catalogues of many manufacturers or large corporations. The disclosed searching methodology permits users to readily comprehend how to search and efficiently find the proper item to be ordered. This is particularly useful when there are a large number of users who need to search and order.

One important example of searching is represented by users on the shop floor of sizeable manufacturers. It is not always practical to reach every individual for training and, given time constraints in a manufacturing environment, it is important that a searcher be able to quickly search for and order a needed part, and be confident that it is the correct one and know whether or not it is in stock in the user's location or one nearby. Failure to disburse the correct part can delay an assembly line or other factory operation, causing large economic loss.

Additionally, the parametric searching of the disclosed invention is effective for large organizations, in particular, because of the large number of people and time involved in ordering. Time saved in training because of an easy to use system, and in making quicker and correct searches and orders, has the potential for large savings. These characteristics also make the parametric searching tool an attractive one for e-commerce applications. Examples include exchanges and hubs, where a service organization or corporation interconnects suppliers and manufacturers with potential purchasers by putting their catalogues on a network. In such examples, fees are typically charged for the service. Fees can be associated with searching, search results, users using the tool, and/or for other subscription, transaction or the like activities. The disclosed invention provides excellent opportunities for savings to those using the service, attracting more users and justifying fees charged.

The invention and the manner and process of making and using it are now described in such full, clear, concise and exact terms as to enable any person skilled in the art to which it pertains, to make and use the same. It is to be understood that the foregoing describes preferred embodiments of the present invention and that modifications may be made therein without departing from the spirit or scope of the present invention as set forth in the claims. To particularly point out and distinctly claim the subject matter regarded as invention, the following claims conclude this specification.

The invention claimed is:

1. A method of performing parametric searching using a computer, comprising:

providing, via a user interface, a first keyword associated with a desired item;

based on the provided keyword, displaying a hierarchical selection tree from which a second keyword that identifies a characteristic of the desired item may be selected;

selecting the second keyword;

based on the second keyword, generating a list of attribute characteristics associated with the second keyword;

providing at least one specific attribute for at least one of the listed attribute characteristics;

performing a search for items having the at least one specific attribute, based on the provided at least one specific attribute; and generating search results that include items having the at least one specific attribute.

2. The method of claim 1, further including providing, in the user interface, an entry area into which the first keyword may be entered in order to search for the second keyword.

3. The method of claim 1, further including displaying a manipulable and scalable image of one or more of the items.

4. An apparatus for performing parametric searching, comprising:

a processor; and a computer system that includes the processor, the computer system programmed to:

display a user interface including a hierarchical keyword selection tree that includes at least a first keyword associated with a desired item and a second keyword that identifies a characteristic of the desired item;

generate, based on the second keyword, a list of attribute characteristics associated with the second keyword;

receive input of at least one specific attribute for at least one of the listed attribute characteristics;

perform a search for items having the at least one specific attribute, based on the provided at least one specific attribute; and generate search results that include items having the at least one specific attribute.

5. A computer-readable medium storing a program of instructions executable by a computer to perform parametric searching, the instructions comprising:

instructions for receiving, via a user interface, selection of a first keyword associated with a desired item;

instructions for, based on the selected keyword, displaying a hierarchical selection tree from which a second keyword that identifies a characteristic of the desired item may be selected;

instructions for receiving, via the user interface, a selection of the second keyword;

instructions for generating, based on the second keyword, a list of attribute characteristics associated with the second keyword;

instructions for providing at least one specific attribute for at least one of the listed attribute characteristics;

instructions for performing a search for items having the at least one specific attribute, based on the provided at least one specific attribute;

instructions for generating search results that include items having the at least one specific attribute; and instructions for including in the search results a list of sortable items and one or more associated characteristics for each item.

6. The method of claim 2, further including selecting the second keyword from the hierarchical selection tree.

7. The method of claim 1, further including providing the at least one specific attribute for at least one of the listed attribute characteristics by entering a value into a text entry area for the at least one specific attribute.

8. The method of claim 7, wherein the search results include a list of sortable items and one or more associated characteristics for each item.

9. The method of claim 8, wherein the list is sorted according to a user-selectable sort order.

10. The apparatus of claim 4, wherein the computer system is further programmed to display, in the user interface, an entry area into which the first keyword may be entered in order to search for the second keyword.

11. The apparatus of claim 4 wherein the computer system is further programmed to display a manipulable and scalable image of one or more of the items.

12. The apparatus of claim 4 wherein the computer system is further programmed to permit selection of the second keyword from the hierarchical selection tree.

13. The apparatus of claim 4, wherein the computer system is further programmed to receive input of the at least one specific attribute for at least one of the listed attribute characteristics by receiving a value from a text entry area for the at least one specific attribute.

14. The apparatus of claim 4, wherein the computer system is further programmed to include in the search results a list of sortable items and one or more associated characteristics for each item.

15. The apparatus of claim 14, wherein the computer system is further programmed to sort the list according to a user-selectable sort order.

16. The computer-readable medium of claim 5, wherein the instructions further include instructions for permitting a user to sort the search results by creating a prioritized order of a plurality of characteristics for sorting.

17. The computer-readable medium of claim 5, wherein the instructions further include instructions for displaying a manipulable and scalable image of one or more of the items.

18. The computer-readable medium of claim 17, wherein the instructions further include instructions for displaying the at least one specific attribute with the image.

19. A computer-readable medium storing a program of instructions executable by a computer to perform parametric searching, the instructions comprising:

instructions for displaying in a user interface a hierarchical selection tree from which a first keyword associated with an item and a second keyword associated with a item and that more narrowly describes the item may be selected;

instructions for displaying in the user interface an entry area into which the first keyword may be entered in order to search for the second keyword;

instructions for receiving, via the user interface, selection of the second keyword;

instructions for generating, based on the selected second keyword, a list of attribute characteristics associated with the second keyword;

instructions for providing at least one specific attribute for at least one of the listed attribute characteristics;

instructions for performing a search for items associated with the second keyword and having the at least one specific attribute, based on the provided at least one specific attribute; and instructions for generating search results that include items having the at least one specific attribute.

20. The computer-readable medium of claim 19, wherein the instructions further include:

instructions for displaying a manipulable and scalable image of one or more of the items; and instructions for including in the search results a list of items and one or more attributes, the list sortable according to one or more associated characteristics for each item.

* * * * *